US012641456B2

(12) United States Patent
Feng

(10) Patent No.: US 12,641,456 B2
(45) Date of Patent: May 26, 2026

(54) APPLICATION INSTANCE DEPLOYMENT METHOD AND APPARATUS, AND READABLE STORAGE MEDIUM

(71) Applicant: Huawei Technologies Co., Ltd., Shenzhen (CN)

(72) Inventor: Jiangping Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 675 days.

(21) Appl. No.: 17/896,323

(22) Filed: Aug. 26, 2022

(65) Prior Publication Data

US 2022/0408272 A1 Dec. 22, 2022

Related U.S. Application Data

(63) Continuation of application No. PCT/CN2021/077033, filed on Feb. 20, 2021.

(30) Foreign Application Priority Data

Feb. 27, 2020 (CN) .......................... 202010125021.1

(51) Int. Cl.
*H04W 24/08* (2009.01)
*H04L 41/14* (2022.01)
(Continued)

(52) U.S. Cl.
CPC ............. *H04W 24/08* (2013.01); *H04L 41/14* (2013.01); *H04W 16/04* (2013.01); *H04W 16/18* (2013.01); *H04W 16/22* (2013.01)

(58) Field of Classification Search
CPC ..... H04W 24/08; H04W 16/04; H04W 16/18; H04W 16/22; H04W 24/06; H04L 41/14; H04L 41/147
See application file for complete search history.

(56) References Cited

U.S. PATENT DOCUMENTS 11,140,665 B2 * 10/2021 Jin ...................... H04L 61/2521
2018/0253214 A1 * 9/2018 Luna ................... G06F 3/04842
(Continued)

FOREIGN PATENT DOCUMENTS

CN 104685533 A 6/2015
CN 107886363 A 4/2018
(Continued)

OTHER PUBLICATIONS

Trieu C. Chieu et al. "Dynamic Scaling of Web Applications in a Virtualized Cloud Computing Environment", Oct. 21-23, 2009, total 6 pages (Year: 2009).*
(Continued)

*Primary Examiner* — Yuwen Pan
*Assistant Examiner* — Swati Jain
(74) *Attorney, Agent, or Firm* — WOMBLE BOND DICKINSON (US) LLP

(57) ABSTRACT

This application provides an application instance deployment method, apparatus, and a readable storage medium. In one embodiment, a data analysis network element receives a first message from a first network element, where the first message includes indication information used to indicate a first area. The first message is used to request first indication information that includes prediction information of a terminal device accessing an application instance of a target application in the first area. The data analysis network element determines the first indication information, and sends the first indication information to the first network element.

17 Claims, 13 Drawing Sheets

(51) Int. Cl.

| | |
|---|---|
| *H04W 16/04* | (2009.01) |
| *H04W 16/18* | (2009.01) |
| *H04W 16/22* | (2009.01) |

(56) References Cited

U.S. PATENT DOCUMENTS

| | | | | |
|---|---|---|---|---|
| 2018/0310150 | A1* | 10/2018 | Cuevas Ramirez | .... H04W 4/20 |
| 2019/0272178 | A1* | 9/2019 | Hu | .......... G06F 9/451 |
| 2019/0289427 | A1* | 9/2019 | Lin | ........ H04W 4/029 |
| 2019/0340928 | A1* | 11/2019 | Goldman | ............. G06Q 50/40 |
| 2019/0369736 | A1* | 12/2019 | Rakshit | ................ G06F 3/011 |
| 2022/0094764 | A1* | 3/2022 | Kim | ................. H04L 67/1031 |
| 2022/0224600 | A1* | 7/2022 | Giust | ................. H04L 67/141 |

FOREIGN PATENT DOCUMENTS

| | | | |
|---|---|---|---|
| CN | 108540549 | A | 9/2018 |
| CN | 109495929 | A | 3/2019 |
| CN | 110098947 | A | 8/2019 |
| CN | 110308995 | A | 10/2019 |
| CN | 110730482 | A | 1/2020 |
| CN | 110308995 | B * | 11/2021 | ....... G06F 18/24323 |
| CN | 110247793 | B * | 11/2022 | ......... H04L 41/5051 |
| EP | 3826359 | A1 * | 5/2021 | ....... H04W 36/0033 |
| WO | 2019158101 | A1 | 8/2019 |
| WO | 2019242624 | A1 | 12/2019 |
| WO | 2019242856 | A1 | 12/2019 |

OTHER PUBLICATIONS

Samsung, "A new use case for edge computing support", SA WG2 Meeting #136 S2-1911575, Nov. 18 Nov. 22, 2019, Reno, USA, Total 2 Pages.

Ericsson, "Editor s Notes cleanup", SA WG2 Meeting #136 S2-1911497, Nov. 18 22, 2019, Reno, NV, US, Total 6 Pages.

3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.

Trieu C. Chieu et al:"Dynamic Scaling of Web Applications in a Virtualized Cloud Computing Environment",Oct. 21-23, 2009, total 6 pages.

* cited by examiner

900

1000

APPLICATION INSTANCE DEPLOYMENT METHOD AND APPARATUS, AND READABLE STORAGE MEDIUM

CROSS-REFERENCE TO RELATED APPLICATION

This application is a continuation of International Application No. PCT/CN2021/077033, filed on Feb. 20, 2021, which claims priority to Chinese Patent Application No. 202010125021.1, filed on Feb. 27, 2020. The disclosures of the aforementioned applications are hereby incorporated by reference in their entireties.

TECHNICAL FIELD

This application relates to the field of mobile communication technologies, and in particular, to an application instance deployment method and an apparatus, and a readable storage medium.

BACKGROUND

To effectively meet requirements of development of mobile communication for high bandwidth and a low latency, the European Telecommunications Standards Institute (ETSI) proposed a multi-access edge computing (MEC) solution in 2014. MEC is a technology for deeply integrating a base station and an internet service based on a 5th generation (5G) evolution architecture. MEC provides a cloud computing-based capability for a mobile user at an edge of an operator network close to the user, so that the user can deploy an application at the edge of the network by using the capability. After the cloud computing-based capability is deployed at the edge of the network, a terminal can directly access an application instance deployed on an edge node in the network, to accelerate application access by the terminal device, accelerate delivery and downloading of content, services, and applications in the network, and allow a consumer to have network experience with higher quality. A quantity of application instances deployed on the edge node may be determined based on a volume of access traffic.

In an internet of vehicles service shown in FIG. 1A, three vehicles access application instances of a target application on an edge node in a location area 1, and two application instances of the target application are deployed on the edge node 1 in the location area, so that access requirements of the three vehicles can be met. One vehicle in an adjacent location area 2 accesses the application instances of the target application, and one application instance of the target application is deployed on a corresponding edge node 2, so that an access requirement of the vehicle can be met. When all of the three vehicles in the location area 1 move to the location area 2, the application instance on the edge node 2 cannot meet access requirements of the four vehicles, and in this case, capacity expansion needs to be performed or more application instances of the target application need to be deployed in a timely manner.

In a conventional technology, a terminal can determine, only when the terminal has accessed an application instance of a target application deployed on an edge node, whether more application instances need to be deployed or capacity expansion of application instances needs to be performed. If capacity expansion is not performed or more application instances are not deployed in a timely manner, the application instance may be overloaded.

SUMMARY

Embodiments of this application provide an application instance deployment method and apparatus, and a readable storage medium, to predict whether a deployment capacity of application instances of a target application can meet a future requirement, so that capacity expansion of the application instances of the target application is performed in advance.

According to a first aspect, an embodiment of this application provides an application instance deployment method. The method may be implemented by a data analysis network element or a chip in the data analysis network element. The data analysis network element may be a network data analysis function (NWDAF) network element in a 5G core network. The method includes: The data analysis network element receives a first message from a first network element, where the first message includes indication information used to indicate a first area, and the first message is used to request to obtain first indication information; the data analysis network element determines the first indication information; and the data analysis network element sends the first indication information to the first network element, where the first indication information is used to indicate prediction information of a terminal device accessing an application instance of a target application in the first area.

According to the foregoing method, the data analysis network element determines the first indication information based on the first message of the first network element, for example, determines a quantity of terminal devices that are to access the application instance of the target application in the first area, a quantity of terminal devices that are expected to leave the first area and access the application instance of the target application, or a quantity of terminal devices that are expected to enter the first area and access the application instance of the target application. Further, the first network element may predict, based on the first indication information, whether an application capacity deployed for the application instance of the target application meets an access requirement of the terminal device in the first area, to perform proper capacity expansion or reduction. This avoids, in the conventional technology, application instance overload or application instance waste caused because the terminal device can adjust the application instance of the target application based on a quantity of terminal devices actually accessing the application instance of the target application only after the terminal device accesses the application instance of the target application, so that application instance availability is improved.

In an embodiment, the data analysis network element receives the first message from the first network element through a network exposure function (NEF) network element; and the data analysis network element sends the first indication information to the first network element through the NEF network element.

In an embodiment, the first indication information includes at least one of the following: a predicted quantity of terminal devices accessing the application instance of the target application in the first area; a predicted quantity of terminal devices that are to leave the first area and that are in the terminal device accessing the application instance of the target application in the first area; or a predicted quantity of terminal devices that are to enter the first area and access the application instance of the target application.

According to the foregoing method, the prediction information of the terminal device sent by the data analysis network element to the first network element can be flexibly set, to adapt to more application scenarios and improve flexibility of sending the first message.

In an embodiment, the first indication information includes the predicted quantity of terminal devices that are to enter the first area and access the application instance of the target application; the data analysis network element obtains N1 terminal devices accessing an application instance of the target application in a second area; the data analysis network element obtains location information of a terminal device in the N1 terminal devices; and the data analysis network element analyses the location information of the terminal device in the N1 terminal devices, and predicts, from the N1 terminal devices, N2 terminal devices that are to enter the first area, where N1 and N2 are positive integers; and the second area is an area adjacent to the first area.

According to the foregoing method, compared with considering only information about the terminal device in the first area, the terminal device that may access the application instance of the target application in the first area may be more accurately predicted through the N1 terminal devices accessing the application instance of the target application in the second area. This helps improve accuracy of determining, by the data analysis network element, the prediction information of the terminal device accessing the application instance of the target application in the first area.

In an embodiment, the first indication information includes the predicted quantity of terminal devices that are to leave the first area and that are in the terminal device accessing the application instance of the target application in the first area; the data analysis network element obtains M1 terminal devices accessing the application instance of the target application in the first area; the data analysis network element obtains location information of a terminal device in the M1 terminal devices; and the data analysis network element analyzes the location information of the terminal device in the M1 terminal devices, and predicts, from the M1 terminal devices, a quantity of terminal devices that are to leave the first area and that are in the terminal devices accessing the application instance of the target application in the first area, where M1 is a positive integer.

According to the foregoing method, the data analysis network element can estimate prediction information of terminal devices such as a terminal device that may leave the first area and accesses the application instance of the target application, so that the data analysis network element can accurately estimate the prediction information of the terminal device accessing the application instance of the target application in the first area, and provide reliable prediction information of the terminal device for the first network element.

In an embodiment, after that the data analysis network element receives a first message from a first network element, and before that the data analysis network element obtains N1 terminal devices accessing an application instance of the target application in a second area, the method further includes: The data analysis network element sends a second message to an operation, administration, and maintenance network element, where the second message includes indication information used to indicate the first area; the data analysis network element receives network topology information returned by the operation, administration, and maintenance network element, where the network topology information is used to indicate an area adjacent to the first area; and the data analysis network element determines the second area based on the area adjacent to the first area.

For example, the network topology information may be used to indicate a distribution location of each cell in the network, and each cell belongs to the first area or the second area. Further, the data analysis network element determines the second area based on each cell adjacent to the first area.

According to the foregoing method, the data analysis network element may determine the second area based on the network topology information returned by the operation, administration, and maintenance network element, to help the data analysis network element obtain, from a related network element, the N1 terminal devices accessing the application instance of the target application in the second area, to determine the prediction information of the terminal device accessing the application instance of the target application in the first area.

The second message may be a second query request.

For example, the data analysis network element may send the second query request to the operation, administration, and maintenance network element, where the second query request includes the indication information used to indicate the first area; and the data analysis network element receives the network topology information returned by the operation, administration, and maintenance network element. Further, the data analysis network element may determine indication information used to indicate the second area, to help the data analysis network element determine the second area based on the first area, to further obtain, from a related network element in the second area, information about the terminal device accessing the application instance of the target application in the second area.

In an embodiment, the data analysis network element sends a third message to the first network element, where the third message is used to obtain identifiers of the terminal devices accessing the application instance of the target application in the second area, and the third message includes indication information used to indicate the second area; and the data analysis network element receives the identifiers that are of the N1 terminal devices accessing the application instance of the target application in the second area and that are returned by the first network element.

The third message may be a third query request or a third subscription request. In this case, an application function network element is a trusted application function network element in the core network. Therefore, the identifier of the terminal device returned by the application function network element to the data analysis network element may be an internal identifier of the terminal device.

For example, the data analysis network element may send the third query request to the application function network element, where the third query request includes the indication information used to indicate the second area. The data analysis network element receives an internal identifier that is of at least one terminal device accessing the application instance of the target application in the second area and that is returned by the application function network element. Further, the data analysis network element may actively send the third query request to the application function network element based on a requirement, to obtain the internal identifier of the terminal device accessing the application instance of the target application in the second area. This helps the data analysis network element further obtain, based on another second network element, the terminal device that may access the application instance of the target application in the first area.

According to the foregoing method, the data analysis network element may initiate the third query request to the application function network element based on a requirement, to obtain the identifier of the at least one terminal device accessing the application instance of the target application in the second area, to reduce signaling received by the data analysis network element and improve flexibility.

For another example, the data analysis network element may send the third subscription request to the application function network element, where the third subscription request includes the indication information used to indicate the second area. Further, when a first reporting condition is met, the application function network element sends, to the data analysis network element, an internal identifier of at least one terminal device accessing the application instance of the target application in the second area. Further, the data analysis network element receives the internal identifier that is of the at least one terminal device accessing the application instance of the target application in the second area and that is returned by the application function network element. The first reporting condition includes one or more of the following: a reporting periodicity expires, a quantity of terminal devices that access the application instance of the target application in the second area and that are subscribed to by the data analysis network element reaches a first reporting threshold, or a quantity of terminal devices accessing the application instance of the target application in the second area changes.

According to the foregoing method, the data analysis network element does not need to frequently send, to the application function network element, the query request for the identifier of the terminal device accessing the application instance of the target application in the second area, and sends the third subscription request to the application function network element. Further, the application function network element may send, to the data analysis network element based on the first reporting condition, the internal identifier of the at least one terminal device accessing the application instance of the target application in the second area, so that the data analysis network element can obtain change information of the identifier of the terminal device accessing the application instance of the target application in the second area when the terminal device accessing the application instance of the target application in the second area changes, for example, when the terminal device stops accessing the application instance of the target application, or a new terminal device starts to access the application instance of the target application. This helps improve accuracy of the prediction information of the terminal device.

In a scenario in which the application function network element is an untrusted application function network element in the core network, the third message may be a fourth query request or a fourth subscription request.

For example, the data analysis network element sends the fourth query request to the NEF network element, where the fourth query request includes the indication information used to indicate the second area. The NEF network element is configured to obtain an external identifier that is of the terminal device accessing the application instance of the target application in the second area and that is determined by the application function network element based on the indication information used to indicate the second area, and an internal identifier that is of the terminal device accessing the application instance of the target application in the second area and that is determined by a unified data management network element or a user subscription data network element based on the external identifier of the terminal device accessing the application instance of the target application in the second area. The data analysis network element receives an internal identifier that is of at least one terminal device accessing the application instance of the target application in the second area and that is returned by the NEF network element.

According to the foregoing method, the data analysis network element may send, to the untrusted AF through the NEF network element, the query request for the identifier of the terminal device accessing the application instance of the target application in the second area, obtain, through the NEF network element, the internal identifier that is of the terminal device accessing the application instance of the target application in the second area and that is returned by the untrusted AF, and further request, based on the internal identifier of the terminal device, for example, an identifier of a cell of the terminal device, to obtain location information of the terminal device, to determine, based on the location information of the terminal device, the prediction information of the terminal device accessing the application instance of the target application in the first area.

For another example, the data analysis network element sends the fourth subscription request to the NEF network element, where the fourth subscription request includes the indication information used to indicate the second area. The NEF network element is configured to obtain an external identifier that is of the terminal device accessing the application instance of the target application in the second area and that is determined by the application function network element based on the indication information used to indicate the second area, and an internal identifier that is of the terminal device accessing the application instance of the target application in the second area and that is determined by a unified data management network element or a user subscription data network element based on the external identifier of the terminal device accessing the application instance of the target application in the second area. The data analysis network element receives an internal identifier that is of at least one terminal device accessing the application instance of the target application in the second area and that is returned by the NEF network element. The external identifier of the at least one terminal device accessing the application instance of the target application in the second area is sent when a first reporting condition is met. The first reporting condition includes one or more of the following: a reporting periodicity expires, a quantity of terminal devices that access the application instance of the target application in the second area and that are subscribed to by the data analysis network element reaches a first reporting threshold, or a quantity of terminal devices accessing the application instance of the target application in the second area changes.

According to the foregoing method, the data analysis network element may send, to the untrusted AF through the NEF network element, the subscription request for the identifier of the terminal device accessing the application instance of the target application in the second area, obtain, through the NEF network element, the internal identifier that is of the terminal device accessing the application instance of the target application in the second area and that is returned by the untrusted AF, and further request, based on the internal identifier of the terminal device, for example, an identifier of a cell of the terminal device, to obtain location information of the terminal device, to estimate, based on the location information of the terminal device, the predicted terminal device accessing the application instance of the target application in the first area.

In an embodiment, the data analysis network element sends a fourth message to an access and mobility management function network element, where the fourth message is used to obtain location information of a terminal device whose location changes in the terminal devices accessing the application instance of the target application in the second area, and the fourth message includes the identifiers of the terminal devices accessing the application instance of the target application in the second area; and the data analysis network element receives the location information of the terminal device from the access and mobility management function network element.

An internal identifier of the terminal device accessing the application instance of the target application in the second area may be an internal identifier of one of the terminal devices accessing the application instance of the target application in the second area, may be internal identifiers of a plurality of terminal devices accessing the application instance of the target application in the second area, or may be a list of internal identifiers of a plurality of terminal devices accessing the application instance of the target application in the second area.

An example in which the fourth message may be a fifth query request or a fifth subscription request is used below for description.

For example, the data analysis network element sends the fifth query request to the access and mobility management function network element, where the fifth query request includes the internal identifier of the terminal device accessing the application instance of the target application in the second area. The data analysis network element receives the location information of the terminal device from the access and mobility management function network element.

According to the foregoing method, the data analysis network element may send, to the access and mobility management function network element based on a requirement, the query request for the location information of the terminal device accessing the application instance of the target application in the second area, to obtain the location information of the terminal device accessing the application instance of the target application in the second area, and further estimate the predicted terminal device accessing the application instance of the target application in the first area.

For another example, the data analysis network element sends the fifth subscription request to the access and mobility management function network element, where the fifth subscription request includes the internal identifier of the terminal device accessing the application instance of the target application in the second area. The data analysis network element receives the location information of the terminal device from the access and mobility management function network element. The location information of the terminal device is sent when a second reporting condition is met. The second reporting condition includes one or both of the following: the location of the terminal device changes, or a reporting periodicity expires.

According to the foregoing method, the data analysis network element may send the fifth subscription request to the access and mobility management function network element without actively sending the request. Further, when the second reporting condition is met, the access and mobility management function network element sends, to the data analysis network element, the location information of the terminal device accessing the application instance of the target application in the second area, so that signaling overheads can be reduced.

In an embodiment, the data analysis network element obtains the location information of the terminal device from a second network element, where the location information of the terminal device is information about the second area. The data analysis network element determines a movement track of the terminal device based on the location information of the terminal device and historical location information of the terminal device, where the movement track is used to indicate a movement direction of the terminal device and a location that the terminal device passes through during movement. The data analysis network element determines, based on the movement track and network topology information, the first area that the terminal device is to enter, where the network topology information is used to indicate a distribution location of each cell in the network, and each cell belongs to the first area or the second area.

According to the foregoing method, the data analysis network element determines the movement track of the terminal device based on the location information of the terminal device and the historical location information of the terminal device, to predict information about the first area that the terminal device is to enter, so that the predicted terminal device accessing the application instance of the target application in the first area is better estimated.

In an embodiment, the data analysis network element receives a first subscription request sent by the first network element, where the first subscription request is used to obtain, when a third reporting condition is met, a predicted quantity of terminal devices accessing the application instance of the target application in the first area. The third reporting condition includes one or more of the following: a quantity of terminal devices whose locations change and that are to access the application instance of the target application is greater than a first preset threshold, a quantity of terminal devices that are to leave the first area and access the application instance of the target application is greater than a second preset threshold, a quantity of terminal devices that are to enter the first area and access the application instance of the target application is greater than a third preset threshold, or a reporting periodicity expires. When the third reporting condition is met, the data analysis network element sends, to the first network element, the prediction information of the terminal device accessing the application instance of the target application in the first area.

According to the foregoing method, the first network element does not need to actively query for a change of the terminal device accessing the application instance of the target application in the first area, and the first network element may send the first subscription request to the data analysis network element based on a requirement, so that the data analysis network element sends, to the first network element when the third reporting condition is met, the prediction information of the terminal device accessing the application instance of the target application in the first area. This helps provide reliable prediction information of the terminal device for the first network element, and helps improve effectiveness of deploying, by the first network element, an application instance corresponding to the application instance of the target application.

In an embodiment, the first area includes at least one of the following:

one or more cells, one or more tracking areas, a geometric area including one or more pieces of coordinate information, or an area corresponding to administrative region information of the first area.

The second area includes at least one of the following:

one or more cells, one or more tracking areas, a geometric area including one or more pieces of coordinate information, or an area corresponding to administrative region information of the second area.

Based on this solution, a quantity of terminal devices in the first area, for example, a quantity of terminal devices accessing the application instance of the target application in the first area, may be obtained based on the first area. Similarly, a quantity of terminal devices in the second area, for example, a quantity of terminal devices accessing the application instance of the target application in the second area, may be obtained based on the second area, to determine the prediction information of the terminal device in the first area.

In an embodiment, the indication information used to indicate the first area includes at least one of the following: an identifier of one or more cells included in the first area; an identity of one or more tracking areas included in the first area; a geometric area including one or more pieces of coordinate information of the first area; or administrative region information of the first area.

In an embodiment, the first area may be an area served by a first edge node, and the prediction information of the terminal device is used to assist in deploying the application instance of the target application on the first edge node; the second area is an area served by a second edge node; and that the second area is an area adjacent to the first area includes: A cell included in the first area is a neighboring cell of a cell included in the second area.

According to a second aspect, an embodiment of this application provides an application instance deployment method. The method includes: A first network element sends a first message to a data analysis network element, where the first message includes indication information used to indicate a first area, and the first message is used to request to obtain the first indication information; the first network element receives the first indication information from the data analysis network element, where the first indication information is used to indicate prediction information of a terminal device accessing an application instance of a target application in the first area; and the first network element deploys the application instance of the target application in the first area based on the first indication information.

According to the foregoing method, the first network element sends the first message to the data analysis network element, to obtain the first indication information determined by the data analysis network element, for example, predict a quantity of terminal devices accessing the application instance of the target application in the first area; predict a quantity of terminal devices that are to leave the first area and access the application instance of the target application and that are in the terminal device accessing the application instance of the target application in the first area; or predict a quantity of terminal devices that are to enter the first area and access the application instance of the target application. Further, the first network element may predict, based on the first indication information, whether an application capacity deployed for the application instance of the target application meets an access requirement of the terminal device, to perform proper capacity expansion or reduction. This avoids, in the conventional technology, application instance overload or application instance waste caused because the terminal device can adjust the application instance of the target application based on a quantity of terminal devices actually accessing the application instance of the target application only after the terminal device accesses the application instance of the target application.

In an embodiment, the first network element sends the first message to the data analysis network element through an NEF network element; and the first network element receives the first indication information from the data analysis network element.

In one embodiment, the first indication information includes at least one of the following: a predicted quantity of terminal devices accessing the application instance of the target application in the first area; a predicted quantity of terminal devices that are to leave the first area and that are in the terminal device accessing the application instance of the target application in the first area; or a predicted quantity of terminal devices that are to enter the first area and access the application instance of the target application. According to the foregoing method, compared with considering only information about the terminal device in the first area, the second network element may more accurately determine, by using the prediction information of the terminal device in the first area, the predicted quantity of terminal devices accessing the application instance of the target application in the first area. This helps the first network element predict whether the application capacity deployed for the application instance of the target application meets the access requirement of the terminal device, to perform proper capacity expansion or reduction.

In an embodiment, the first network element receives a third message from the data analysis network element, where the third message includes indication information used to indicate a second area, and the third message is used to obtain an identifier of at least one terminal device accessing an application instance of the target application in the second area; and the first network element sends, to the data analysis network element, the identifier of the at least one terminal device accessing the application instance of the target application in the second area.

The following uses an example in which the first network element is a trusted application function network element in a core network and the third message is a third query request or a third subscription request for description.

For example, the first network element receives the third query request from the data analysis network element; and the first network element returns, to the data analysis network element, the identifier of the terminal device accessing the application instance of the target application in the second area.

Based on this solution, the terminal device accessing the application instance of the target application in the second area may be obtained, to help predict a terminal device that may access the application instance of the target application in the first area in a future time period. In this case, the first network element may obtain the third query request from the data analysis network element through querying, and directly send, to the data analysis network element, an internal identifier of the terminal device accessing the application instance of the target application in the second area. This helps the data analysis network element predict the terminal device that may access the application instance of the target application in the first area in a future time period.

For another example, the first network element receives the third subscription request from the data analysis network element. When a first reporting condition is met, the first network element returns, to the data analysis network element, the identifier of the terminal device accessing the application instance of the target application in the second area. The first reporting condition includes one or more of the following: a reporting periodicity expires, a quantity of terminal devices that access the application instance of the target application in the second area and that are subscribed to by the data analysis network element reaches a first reporting threshold, or a quantity of terminal devices accessing the application instance of the target application in the second area changes.

Based on this solution, the first network element is the trusted network element in the core network, and may send, to the data analysis network element through subscription when the first reporting condition is met, the internal identifier of the terminal device accessing the application instance of the target application in the second area, to reduce signaling overheads, and help predict the terminal device that may access the application instance of the target application in the first area in a future time period.

In one embodiment, the first network element receives, from an NEF network element, the third query request from the data analysis network element; and the first network element returns, to the NEF network element, the identifier of the terminal device of the application instance accessing the target application in the second area, so that the NEF network element sends, to the data analysis network element, the identifier of the terminal device accessing the application instance of the target application in the second area.

Based on this solution, the first network element is an untrusted application function network element in the core network. In this case, the first network element may obtain, from the NEF network element through querying, the third query request from the data analysis network element, to reduce signaling overheads, and help the data analysis network element predict the terminal device that may access the application instance of the target application in the first area in a future time period.

In one embodiment, the first network element receives, from an NEF network element, a fourth subscription request from the data analysis network element. When a first reporting condition is met, the first network element returns, to the NEF network element, an external identifier of the terminal device accessing the application instance of the target application in the second area. The first reporting condition includes one or more of the following: a reporting periodicity expires, a quantity of terminal devices accessing the application instance of the target application in the second area reaches a first reporting threshold, or a quantity of terminal devices accessing the application instance of the target application in the second area changes.

Based on this solution, the first network element is an untrusted application function network element in the core network. In this case, the first network element may access, from the NEF network element through subscription, the fourth subscription request from the data analysis network element in the second area. When the first reporting condition is met, the NEF sends, to the data analysis network element, the identifier of the terminal device accessing the application instance of the target application in the second area, to reduce signaling overheads, and help the data analysis network element predict the terminal device that may access the application instance of the target application in the first area in a future time period.

In one embodiment, if the first network element determines, based on the prediction information of the terminal device accessing the application instance of the target application in the first area, that the predicted quantity of terminal devices in the first area is greater than a first threshold, the first network element correspondingly increases a quantity of application instances of the target application in the first area; or if the first network element determines, based on the prediction information of the terminal device accessing the application instance of the target application in the first area, that the predicted quantity of terminal devices in the first area is less than a second threshold, the first network element correspondingly decreases a quantity of application instances of the target application in the first area.

For example, when the first indication information includes the predicted quantity of terminal devices that are to leave the first area and that are in the terminal device accessing the application instance of the target application in the first area and the predicted quantity of terminal devices that are to enter the first area and that are in the terminal device accessing the application instance of the target application in the first area, there may be the following three manners:

Manner a1: The first network element determines, based on a quantity of terminal devices currently accessing the application instance of the target application in the first area, the predicted quantity of terminal devices that leave the first area, and the predicted quantity of terminal devices that enter the first area, the predicted quantity of terminal devices accessing the application instance of the target application in the first area.

If the first network element determines that a difference between the predicted quantity of terminal devices accessing the application instance of the target application in the first area and a quantity of terminal devices carried in the application instance of the target application is greater than the first threshold, the first network element correspondingly increases the quantity of application instances of the target application in the first area. If the first network element determines that a difference between a quantity of terminal devices carried in the application instance of the target application and the predicted quantity of terminal devices accessing the application instance of the target application in the first area is less than the second threshold, the first network element correspondingly decreases the quantity of application instances of the target application in the first area.

Manner a2: If the first network element determines that the predicted quantity of terminal devices accessing the application instance of the target application in the first area is greater than the first threshold, the first network element correspondingly increases the quantity of application instances of the target application in the first area. If the first network element determines that the predicted quantity of terminal devices accessing the application instance of the target application in the first area is less than the second threshold, the first network element correspondingly decreases the quantity of application instances of the target application in the first area.

Manner a3: The first network element determines, based on the predicted quantity of terminal devices that leave the first area and the predicted quantity of terminal devices that enter the first area, a predicted change quantity of terminal devices accessing the application instance of the target application in the first area.

If the first network element determines that the predicted change quantity of terminal devices accessing the application instance of the target application in the first area is greater than the first threshold, the first network element correspondingly increases the quantity of application instances of the target application in the first area. If the first network element determines that the predicted change quantity of terminal devices accessing the application instance of the target application in the first area is less than the second threshold, the first network element correspondingly decreases the quantity of application instances of the target application in the first area.

For another example, if the first indication information includes the predicted quantity of terminal devices that enter the first area and that are in the terminal device accessing the application instance of the target application in the first area, the following three manners may be included:

Manner b1: The first network element determines, based on a quantity of terminal devices currently accessing the application instance of the target application in the first area and the predicted quantity of terminal devices that enter the first area, the predicted quantity of terminal devices accessing the application instance of the target application in the first area. If the first network element determines that the predicted quantity of terminal devices accessing the application instance of the target application in the first area is greater than the first threshold, the first network element correspondingly increases the quantity of application instances of the target application in the first area.

Manner b2: If the first network element determines that a difference between the predicted quantity of terminal devices accessing the application instance of the target application in the first area and a quantity of terminal devices carried in the application instance of the target application is greater than the first threshold, the first network element correspondingly increases the quantity of application instances of the target application in the first area.

Manner b3: The first network element determines, based on the predicted quantity of terminal devices that enter the first area, a predicted increased quantity of terminal devices accessing the application instance of the target application in the first area. If the first network element determines that the predicted increased quantity of terminal devices accessing the application instance of the target application in the first area is greater than the first threshold, the first network element correspondingly increases the quantity of application instances of the target application in the first area.

In another example, if the first indication information includes the predicted quantity of terminal devices that leave the first area and that are in the terminal device accessing the application instance of the target application in the first area, the following manner may be included:

Manner c1: The first network element determines, based on a quantity of terminal devices currently accessing the application instance of the target application in the first area and the predicted quantity of terminal devices that leave the first area, the predicted quantity of terminal devices accessing the application instance of the target application in the first area. If the first network element determines that the quantity of terminal devices accessing the application instance of the target application in the first area is less than the second threshold, the first network element decreases the application instance of the target application in the first area.

It should be noted that the first threshold and the second threshold are different in Manner a1 to Manner a3, Manner b1 to Manner b3, and Manner c1. In one embodiment, a value may be set based on a requirement. This is not limited herein.

Based on the foregoing solution, the first network element determines, through a change of the predicted quantity of terminal devices in the first area, that is, whether the quantity reaches a threshold that is of the application instance of the target application and that needs to be adjusted, whether the quantity of application instances of the target application needs to be adjusted. Further, this helps more properly adjust a deployment solution of the application instance of the target application in the first area.

In one embodiment, the first network element is a network function network element or an application function network element.

In one embodiment, the application function network element is a multi-access edge computing management component managing the application instance of the target application, an application operation and maintenance system managing the application instance of the target application, or a multi-access edge computing platform.

According to a third aspect, a communication apparatus is provided, to implement the foregoing methods. The communication apparatus may be the data analysis network element in the first aspect, or an apparatus including the data analysis network element; or the communication apparatus may be the first network element in the second aspect, or an apparatus including the first network element. The communication apparatus includes a corresponding module, unit, or means for implementing the foregoing methods. The module, unit, or means may be implemented by using hardware or software, or implemented by using hardware by executing corresponding software. The hardware or the software includes one or more modules or units corresponding to the foregoing function.

According to a fourth aspect, an application instance deployment apparatus is provided. The apparatus includes a processor and a memory. The memory is configured to store computer instructions; and when the processor executes the instructions, the application instance deployment apparatus is enabled to perform the method according to any one of the foregoing aspects. The application instance deployment apparatus may be the data analysis network element in the first aspect, or an apparatus including the data analysis network element; or the communication apparatus may be the first network element in the second aspect, or an apparatus including the first network element.

According to a fifth aspect, an application instance deployment apparatus is provided. The apparatus includes a processor. The processor is configured to be coupled to a memory, and after reading instructions in the memory, perform, according to the instructions, the method according to any one of the foregoing aspects. The communication apparatus may be the data analysis network element in the first aspect, or an apparatus including the data analysis network element; or the communication apparatus may be the first network element in the second aspect, or an apparatus including the first network element.

According to a sixth aspect, this application provides an application instance deployment apparatus. The apparatus includes a processor and an interface circuit. The processor is configured to: communicate with another apparatus through the interface circuit, and perform the methods in the foregoing aspects. There are one or more processors.

According to a seventh aspect, this application further provides a chip system. The chip system includes a processor, configured to perform the methods in the foregoing aspects.

According to an eighth aspect, a computer-readable storage medium is provided. The computer-readable storage medium stores instructions; and when the instructions are run on a computer, the computer is enabled to perform the method according to any one of the foregoing aspects.

According to a ninth aspect, a computer program product including instructions is provided. When the instructions are run on a computer, the computer is enabled to perform the method according to any one of the foregoing aspects.

According to a tenth aspect, a communication apparatus (for example, the communication apparatus may be a chip or a chip system) is provided. The communication apparatus includes a processor, configured to implement the function in any one of the foregoing aspects. In an embodiment, the communication apparatus further includes a memory, and the memory is configured to store program instructions and data. When the communication apparatus is the chip system, the communication apparatus may include a chip, or may include a chip and another discrete component.

According to an eleventh aspect, a communication method is provided. The communication method includes: A first network element sends a first message to a data analysis network element, where the first message includes indication information used to indicate a first area, and the first message is used to request to obtain first indication information. The data analysis network element receives the first message from the first network element, and the data analysis network element determines the first indication information, where the first indication information is used to indicate prediction information of a terminal device accessing an application instance of a target application in the first area. The data analysis network element sends the first indication information to the first network element. The first network element receives the first indication information from the data analysis network element. The first network element deploys the application instance of the target application in the first area based on the first indication information. For technical effects brought by the ninth aspect, refer to the technical effects brought by the first aspect or the second aspect. Details are not described herein again.

According to a twelfth aspect, a communication system is provided. The communication system includes a data analysis network element and a first network element. The data analysis network element is configured to: receive a first message from the first network element, where the first message includes indication information used to indicate a first area, and the first message is used to request to obtain first indication information; determine the first indication information, where the first indication information is used to indicate prediction information of a terminal device accessing an application instance of a target application in the first area; and send the first indication information to the first network element. The first network element is configured to: send the first message to the data analysis network element, where the first message includes the indication information used to indicate the first area, and the first message is used to request to obtain the first indication information; receive the first indication information from the data analysis network element; and deploy the application instance of the target application in the first area based on the first indication information. For technical effects brought by the twelfth aspect, refer to the technical effects brought by the first aspect or the second aspect. Details are not described herein again.

DESCRIPTION OF EMBODIMENTS

Figure 1A:
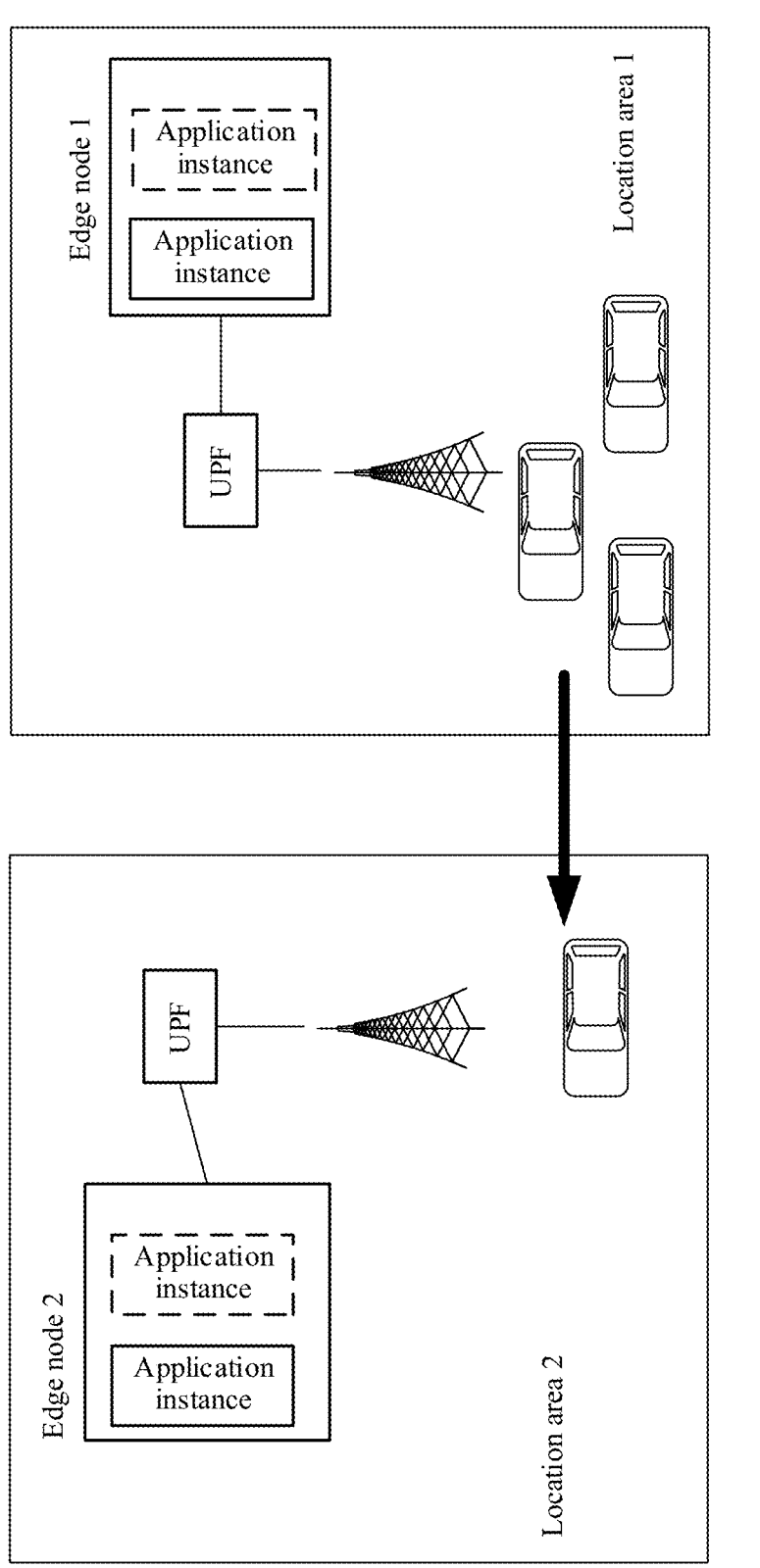
FIG. 1A shows an embodiment of a possible network architecture.
Figure 1B:
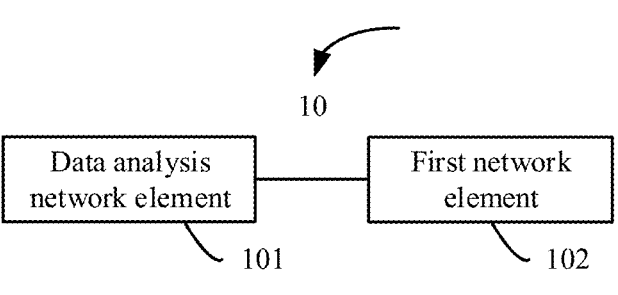
FIG. 1B shows another embodiment of a possible network architecture.

FIG. 1B shows an example of a communication system 10 according to an embodiment of this application. As shown in FIG. 1B, the communication system 10 includes a data analysis network element 101 and a first network element 102. The data analysis network element 101 and the first network element 102 may directly communicate with each other, or may communicate with each other through forwarding performed by another device. This is not limited in this embodiment of this application. A network element or an entity corresponding to the data analysis network element 101 in FIG. 1B may be an NWDAF network element in a 5G network architecture, and a network element or an entity corresponding to the first network element 102 in FIG. 1B may be a network function network element or an application function network element in the 5G network architecture. In this embodiment of this application, the first network element may be a component of an MEC application operation and maintenance system, or may be a component of an MEC management system. For descriptions, refer to subsequent descriptions. Details are not described herein.

As shown in FIG. 1B, the data analysis network element 101 is configured to: receive a first message from the first network element, where the first message includes indication information used to indicate a first area, the first message is used to request first indication information, and the first indication information is used to indicate prediction information of a terminal device accessing an application instance of a target application in the first area; determine the first indication information; and send the first indication information to the first network element.

The first network element 102 sends the first message to the data analysis network element, where the first message includes the indication information used to indicate the first area, the first message is used to request to obtain the first indication information, and the first indication information is used to indicate the prediction information of the terminal device accessing the application instance of the target application in the first area; receives the first indication information from the data analysis network element; and deploys the application instance of the target application in the first area based on the first indication information.

Based on the communication system provided in this embodiment of this application, the first network element may send the first message to the data analysis network element through an interface between the first network element and the data analysis network element, to request the first indication information. Therefore, after the data analysis network element determines the first indication information, the first network element predicts, by using the first indication information, whether an application capacity deployed for the application instance of the target application meets a future requirement, to perform capacity expansion or reduction in advance. An embodiment of the foregoing solution is described in detail in subsequent method embodiments. Details are not described herein.

Figure 2A:
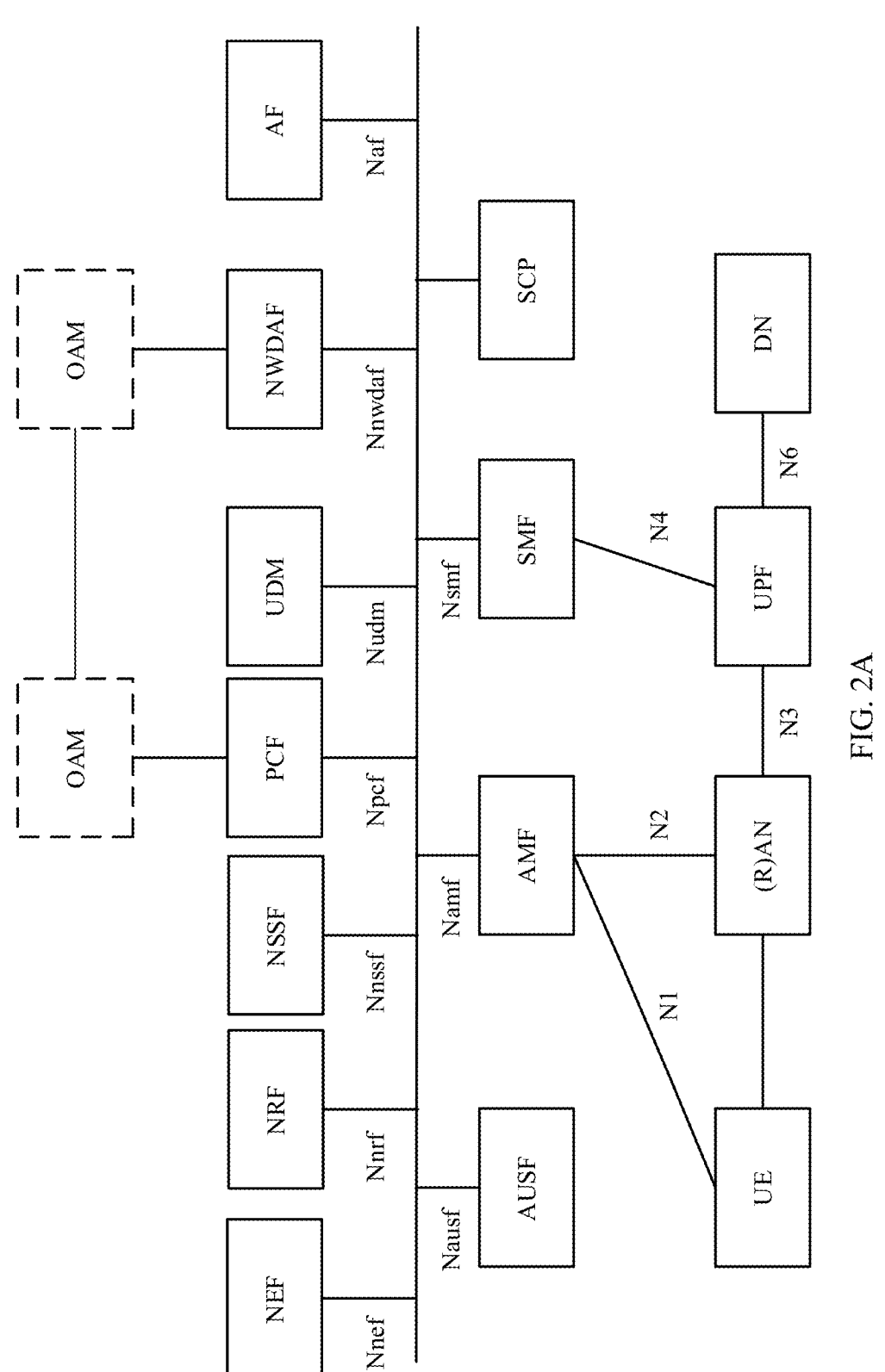
FIG. 2A is a schematic diagram of a 5G network architecture based on a service-oriented architecture.
Figure 2B:
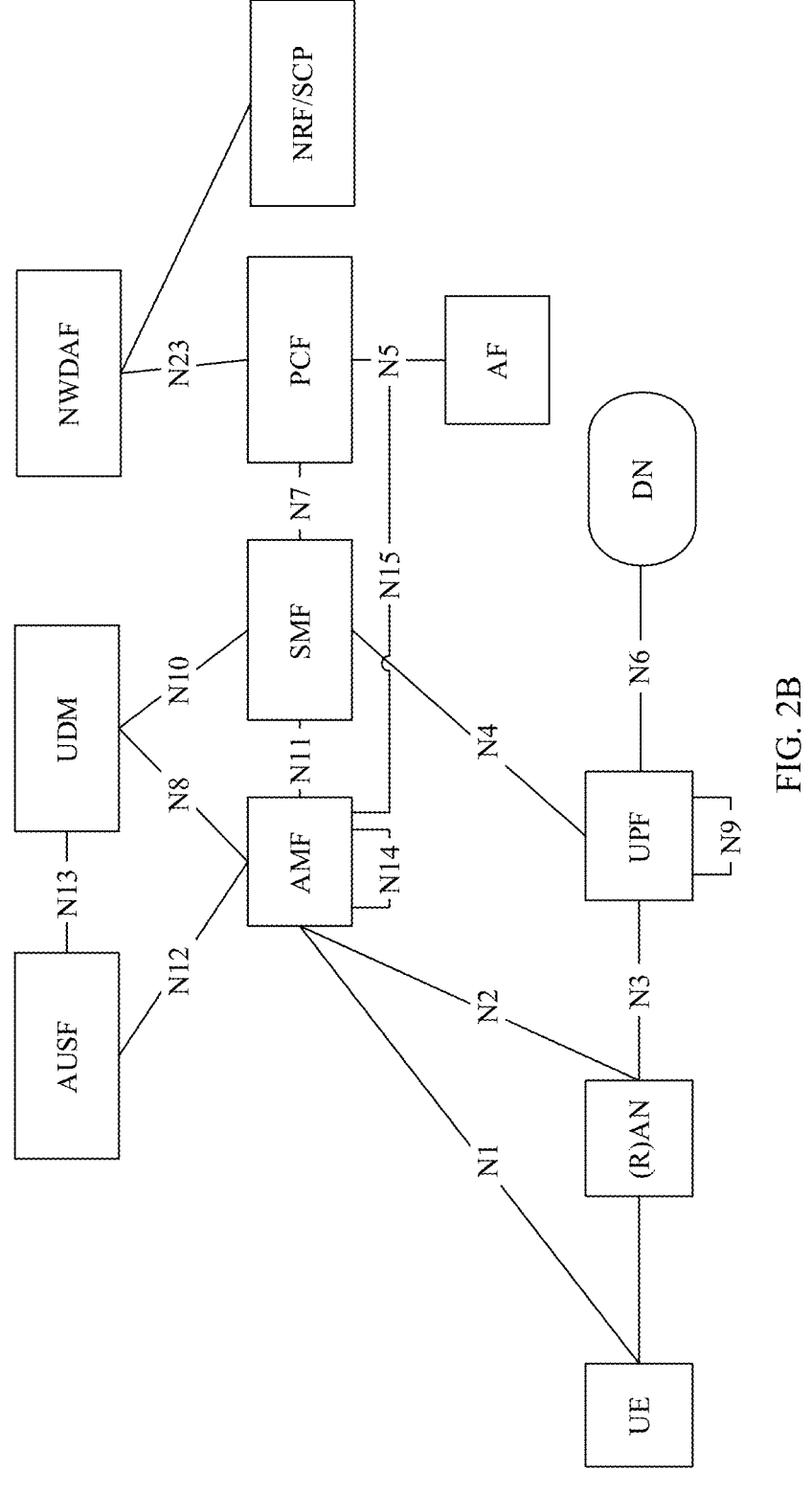
FIG. 2B is a schematic diagram of a 5G network architecture based on a point-to-point interface.

A system architecture in embodiments of this application may be applied to a 5G network architecture. For example, FIG. 2A and FIG. 2B are schematic diagrams of applying a communication system 10 to a 5G network architecture according to embodiments of this application. The following describes related network elements in the system architecture with reference to FIG. 2A and FIG. 2B.

A terminal device may also be referred to as an application client. Some applications may run on the terminal device, and the applications obtain application services by accessing an application instance 101_1 in a data network (DN) 101. For third-party applications, for example, machine-to-machine (machine-to-machine, M2M) applications, internet of things (internet of things, IoT) applications, or vehicle to everything (V2X) applications, that sign a service agreement with an operator in a public land mobile network (PLMN), these applications may run on the terminal device, or may run on a network device.

The terminal device may perform application data transmission to the DN 101 through a 3GPP network.

The terminal device is also referred to as user equipment (UE), a mobile station (MS), a mobile terminal (MT), or the like, and is a device that provides voice or data connectivity for a user, or may be an internet-of-things device. For example, the terminal apparatus 102 includes a handheld device, a vehicle-mounted device, or the like that has a wireless connection function.

The terminal device may be a device configured to implement a wireless communication function, for example, a terminal or a chip that can be used in the terminal. The terminal may be user equipment, an access terminal, a terminal unit, a terminal station, a mobile station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

The terminal device may establish a connection with the operator network through an interface (N1) provided by the operator network, and use services such as a data service and/or a voice service provided by the operator network. The terminal device may further access the DN through the operator network, and use an operator service deployed in the DN and/or a service provided by a third party. The third party may be a service provider other than the operator network and the terminal device, and may provide services such as a data service and/or a voice service for the terminal device. A representation form of the third party may be determined based on an actual application scenario, and is not limited herein.

A radio access network (RAN) is a subnet of the operator network, and is a system between a service node in the operator network and the terminal device. To access the operator network, the terminal device first passes through the RAN, and may be connected to the service node in the operator network through the RAN. A RAN device in this application is a device that provides a wireless communication function for the terminal device, and the RAN device is also referred to as an access network device. The RAN device in this application includes but is not limited to: a next generation NodeB (gNodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like. For ease of description, the RAN device is a RAN for short in this application.

In one embodiment, the RAN device in embodiments of this application is a device that accesses a core network. For example, the RAN device may be a base station, a broadband network gateway (BNG), an aggregation switch, or a non-3rd generation partnership project (3GPP) access device. There may be various forms of base stations, for example, a macro base station, a micro base station (which is also referred to as a small cell), a relay station, and an access point.

An access and mobility management function (AMF) network element mainly supports functions such as registration management, connectivity management, and mobility management of the terminal, is a control plane network element provided by the operator network, and is responsible for access control and mobility management of access of the terminal device to the operator network, for example, including functions such as mobility status management, temporary user identity allocation, and user authentication and authorization.

An operation, administration, and maintenance (OAM) network element means that, based on actual requirements of operator network operation, network management is usually classified into three categories: operation, administration, and maintenance (OAM). The operation mainly completes daily work performed on a network and a service, such as analysis, prediction, planning, and configuration, and the maintenance is mainly a daily operation activity performed on the network and the service, such as testing and fault management.

A unified data management (UDM) network element is mainly responsible for the following functions: (1) generation of a 3GPP authentication certificate and parameter; (2) storing and management of a subscription permanent ID (SUPI) in a 5G system; (3) subscription information management; (4) MT-SMS delivery; (5) SMS management; and (6) registration management of a serving network element (for example, an AMF or an SMF that currently provides a service for a terminal) of a user. The UDM includes a unified data repository (UDR), configured to maintain user subscription information in a mobile communication network, and further support a service discovery function, that is, provide user subscription or service information that meets a service requirement of a requester requesting discovery of a user or service. The information includes a subscription identifier, security credit, user subscription information related to access mobility management, and user subscription information related to session management. In addition, the UDM may also provide policy data for a policy control function (PCF) network element.

A session management function (SMF) network element mainly supports functions such as session establishment, modification, and release, and is further responsible for session-related functions such as UE IP address allocation and management, user plane function (UPF) network element selection and control, tunnel maintenance between a UPF and an AN node, service and session continuity (SSC) mode selection, and roaming. The SMF network element is a control plane network element provided by the operator network, and is responsible for managing a protocol data unit (PDU) session of the terminal device. The PDU session is a channel used to transmit a PDU, and the terminal device needs to transmit a PDU to the DN through the PDU session. The SMF network element is responsible for establishment, maintenance, deletion, and the like of the PDU session.

A UPF network element is a user plane function, and is mainly responsible for packet routing and forwarding of a data packet. The UPF network element is a gateway provided by an operator, and is a gateway for communication between the operator network and the DN. The UPF network element includes user plane—related functions such as packet routing and transmission, packet detection, service usage reporting, quality of service (QoS) processing, lawful interception, uplink packet detection, and downlink packet storage.

The DN may also be referred to as a packet data network (PDN), and is a network located outside the operator network. The operator network may access a plurality of DNs, and a plurality of services may be deployed in the DNs, to provide services such as a data service and/or a voice service for the terminal device. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like in the internal office network of the company. In embodiments of this application, the DN may be an edge data network (EDN), and the EDN may include one or more local DNs.

An NWDAF is used for providing a network data analysis function, and is responsible for analyzing security data and identifying an abnormal security event. The NWDAF network element is a network function newly introduced in 5G, and provides a data analysis service for another network function in the 5G core network. Information to be analyzed may be statistics information of a past event, or may be prediction information. According to the 3GPP protocol 23.288-g10, the NWDAF supports some analysis cases, such as slice load, service experience, and terminal device and subscriber behavior analysis. In embodiments of this application, the network data analysis function network element is a network element having functions of collecting and analyzing data and obtaining a data analysis result, and may be the NWDAF network element in FIG. 1B or FIG. 2A and FIG. 2B, or may be a management data analysis service (MDAS) network element or another network element having a similar function. For ease of description, this application is subsequently described by using an example in which the network data analysis function network element is an NWDAF network element in 5G, and the network data analysis function network element may be an NWDAF network element for short. In embodiments of this application, the NWDAF network element may also be referred to as a network analysis function or a network analysis function network element, which has a same meaning. Unified descriptions are provided herein.

Embodiments of this application provide a deployment mode of an NWDAF network element. The NWDAF may be implemented in a distributed manner, and a distributed entity may be deployed on a 5GC NF side, a RAN side (where in the figure, an example in which a RAN device is a gNB), or inside UE. When being deployed on the 5GC NF/gNB side, the distributed entity can be built in the 5GC NF/gNB as a software module. There is an interaction interface between distributed entities of the NWDAF. During actual deployment, the NWDAF deployed on an AMF network element side and an SMF side may be an independent physical device, an independent virtual device, a software module deployed in the AMF network element/SMF, or an independent software module deployed, close to the AMF network element or the SMF, at a physical location or a network location. The NWDAF may interact with the 5GC NF, the gNB, and the OAM to obtain information, obtain information from the UE, and provide an analysis result to AFs, including an AF on a central side and distributed AF entities deployed on multi-access edge computing. The NWDAF network element may obtain to-be-analyzed data from one or more of the NF network element (the SMF, the PCF network element, the RAN, the UPF, or the like shown in FIG. 2A or FIG. 2B), the AF, the data repository, or the OAM, and then analyze the to-be-analyzed data to obtain a data analysis result. Data analysis performed by the NWDAF network element may be triggered based on a data analysis request or a subscription message sent by a consumer network element (for example, the consumer network element may be an NF network element, a RAN device, or a terminal device), or may be triggered by the data analysis network element based on another condition, for example, periodic triggering or initial event triggering. After obtaining the data analysis result, the data analysis network element may send the data analysis result to the consumer network element that requests to obtain the data analysis result, store the data analysis result in the data repository, or store the data analysis result in the data analysis network element.

The network exposure function NEF network element is a control plane network element provided by the operator. The NEF network element may expose a network capability provided by a mobile communication network for an internal network element (such as an SMF or an AMF) in the mobile communication network or an external third-party application, such as a V2X application or an IoT application. The NEF network element securely exposes an external interface of the operator network to the third party. When the SMF network element needs to communicate with a third-party network element, the NEF network element may serve as a relay for communication between the SMF network element and the third-party network element. When the NEF network element serves as the relay, the NEF network element may invoke the UDM to provide translation of identification information of the subscriber and identification information of the third-party network element. For example, when the NEF needs to send the SUPI of the subscriber from the operator network to the third party, the NEF may invoke the UDM to translate the SUPI into an external identity (ID) corresponding to the subscriber. On the contrary, when the NEF network element sends an external ID (an ID of the third-party network element) to the operator network, the NEF network element may invoke the UDM to translate the external ID into an SUPI.

The application function (AF) network element mainly provides an application layer service, and further supports interaction with the 5G core network to provide a service, for example, affecting a data routing decision and a policy control function, or providing some third-party services for a network side. In an embodiment, the AF network element usually refers to a third-party server or an application server.

The network function (NF) network element is a network element such as the SMF, the PCF network element, the RAN, or the UPF shown in FIG. 2A or FIG. 2B.

A function of another network element is not described in detail herein. For details, refer to a related communication standard protocol.

In embodiments of this application, an example in which the network data analysis function network element 101 is an NWDAF network element and the first network element 102 is a network element is used for description. The network data analysis function network element or the first network element in embodiments of this application may also be referred to as a communication apparatus, and may be a general-purpose device or a dedicated device. This is not limited in embodiments of this application. A related function of the network data analysis function network element or the first network element in embodiments of this application may be implemented by one device, or may be jointly implemented by a plurality of devices, or may be implemented by one or more function modules in one device. This is not limited in embodiments of this application. It may be understood that the foregoing function may be a network element in a hardware device, may be a software function running on dedicated hardware, a combination of hardware and software, or a virtualization function instantiated on a platform (for example, a cloud platform).

In addition, FIG. 2A is a schematic diagram of a 5G network architecture based on a service-oriented architecture. The 5G network architecture may further include one or more of the following network elements: an NEF network element, a PCF network element, a UDM network element, an NRF network element, an AF network element, an NWDAF network element, an authentication server function (AUSF) network element, an AMF network element, an SMF network element, a (R)AN, a UPF network element, and the like. This is not limited in this embodiment of this application. In the foregoing 5G network architecture, a part other than the (radio) access network part may be referred to as a core network part. For ease of description, an example in which the (R)AN is referred to as a RAN is used below for description.

The terminal device communicates with the AMF network element through a next generation (N) 1 interface (N1). The RAN device communicates with the AMF network element through an N2 interface (N2), and the RAN device communicates with the UPF network element through an N3 interface (N3). The UPF network element communicates with the DN through an N6 interface (N6). The AMF network element communicates with the SMF network element through an N11 interface (N11), the AMF network element communicates with the UDM network element through an N8 interface (N8), the AMF network element communicates with the AUSF network element through an N12 interface (N12), and the AMF network element communicates with the PCF network element through an N15 interface (N15). The SMF network element communicates with the PCF network element through an N7 interface (N7), the SMF network element communicates with the UPF network element through an N4 interface (N4), and the SMF network element communicates with the UDM network element through an N10 interface (N10). The UDM network element communicates with the AUSF network element through an N13 interface (N13). The PCF network element communicates with the AF network element through an N5 interface (N5).

In addition, it should be noted that control plane network elements, for example, the AMF network element, the SMF network element, the UDM network element, the AUSF network element, the PCF network element, the LSMF network element, or the AF network element, in the 5G network architecture shown in FIG. 2A may alternatively interact with each other through service-oriented interfaces. For example, as shown in FIG. 2A, an external service-oriented interface provided by the AMF network element may be Namf, an external service-oriented interface provided by the SMF network element may be Nsmf, an external service-oriented interface provided by the UDM network element may be Nudm, an external service-oriented interface provided by the PCF network element may be Npcf, an external service-oriented interface provided by the AUSF network element may be Nausf, and an external service-oriented interface provided by the AF network element may be Naf. For related descriptions, refer to a 5G system architecture in the standard 23501. Details are not described herein.

FIG. 2B is a schematic diagram of a 5G network architecture based on a point-to-point interface. For descriptions of functions of network elements in FIG. 2B, refer to the descriptions of functions of corresponding network elements in FIG. 2A. Details are not described again. A main difference between FIG. 2B and FIG. 2A lies in that interfaces between network elements in FIG. 2A are point-to-point interfaces rather than service-oriented interfaces.

In the architecture shown in FIG. 2B, the terminal device communicates with the AMF network element through an N1 interface (N1). The RAN device communicates with the AMF network element through an N2 interface (N2), and the RAN device communicates with the UPF network element through an N3 interface (N3). The UPF network element communicates with the DN through an N6 interface (N6). The AMF network element communicates with the SMF network element through an N11 interface (N11), the AMF network element communicates with the UDM network element through an N8 interface (N8), the AMF network element communicates with the AUSF network element through an N12 interface (N12), and the AMF network element communicates with a vPCF network element through an N15 interface (N15). The SMF network element communicates with the vPCF network element through an N7 interface (N7). The vPCF network element communicates with an hPCF network element through an N24 interface (N24), and the vPCF network element communicates with the AF network element through an N5 interface (N5). The SMF network element communicates with the UPF network element through an N4 interface (N4), and the SMF network element communicates with the UDM network element through an N10 interface (N10). The UDM network element communicates with the AUSF network element through an N13 interface (N13).

Figure 3:
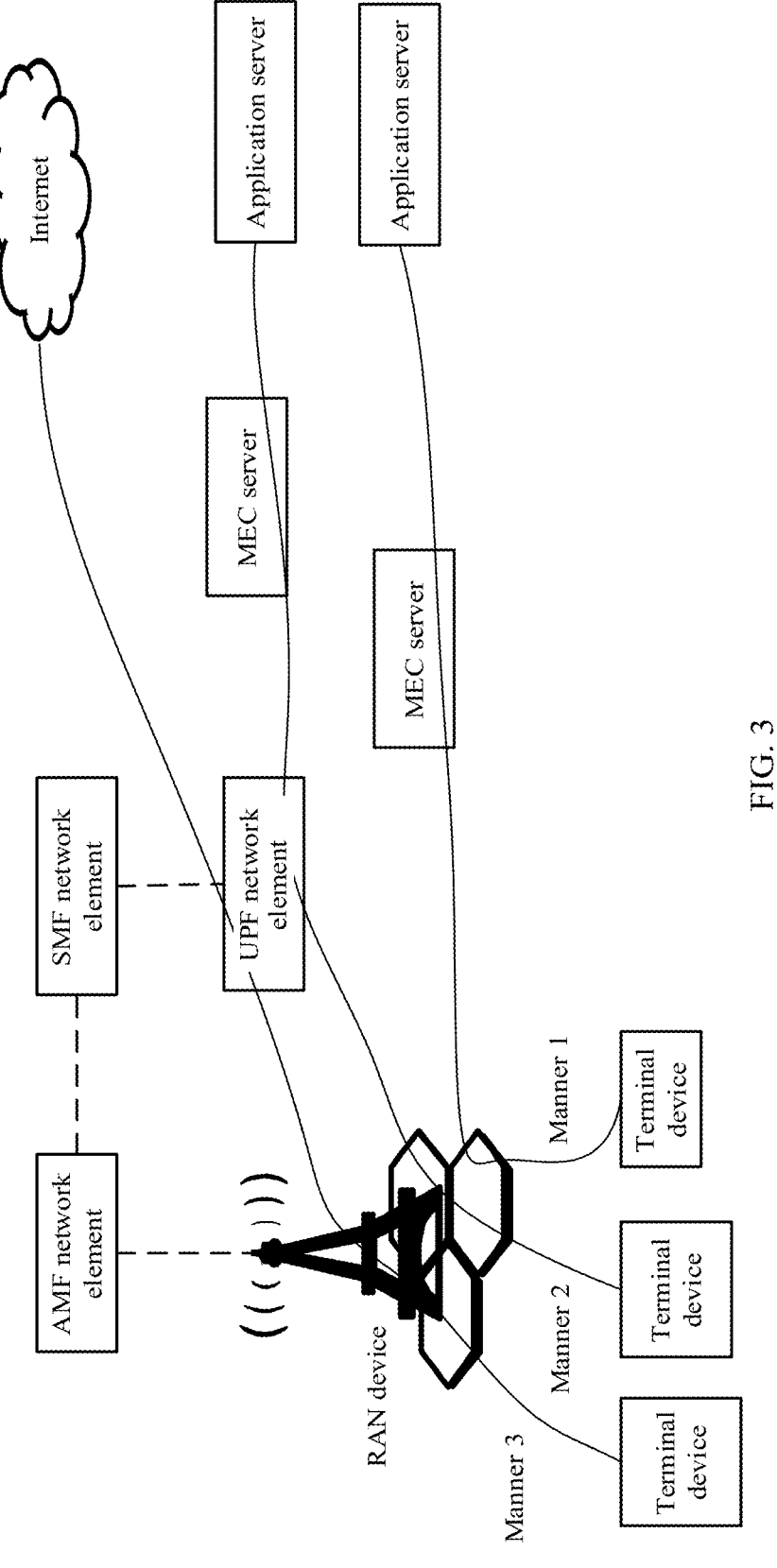
FIG. 3 is a schematic structural diagram of a 5G architecture-based MEC solution.

FIG. 3 shows a 5G architecture-based MEC solution. Usually, the 5G architecture-based MEC solution has two modes. In one mode, an MEC server is deployed behind a radio access network RAN device (as shown in Manner 1 in the figure). The locally deployed MEC server may directly split local service data to a locally deployed application server. This avoids traffic detour in a core network. In the other mode, MEC is deployed on a local UPF network element (as shown in Manner 2 in the figure). Compared with a conventional deployment mode (as shown in Manner 3 in the figure), the MEC solution can provide a low-latency and high-bandwidth service for a user.

Figures 4A, 4B:
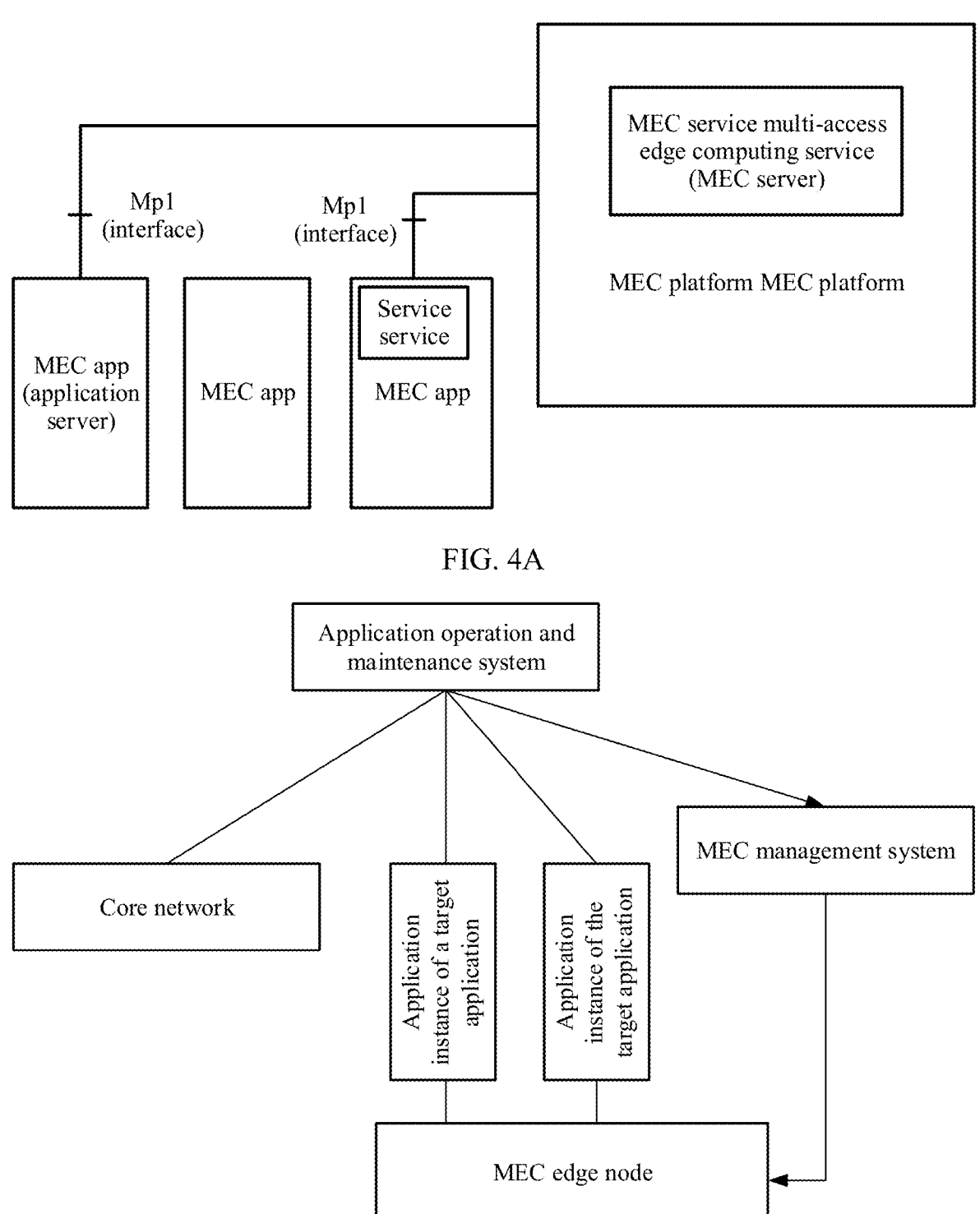
FIG. 4A is a schematic structural diagram of MEC to which this application is applicable.
FIG. 4B to FIG. 4D are schematic system diagrams of MEC to which this application is applicable.

FIG. 4A is a schematic diagram of an MEC architecture according to an embodiment of this application. As shown in the figure, the European Telecommunications Standards Institute (ETSI) defines a reference architecture of MEC in the specification ETSI GS MEC 003. The MEC architecture may include an MEC server and an MEC management system.

The MEC server (an MEC host) may include: a multi-access edge computing platform (MEC platform): a function set required for running various multi-access edge computing applications on a multi-access edge computing server virtualization infrastructure.

The MEC platform can provide and consume various multi-access edge computing services, and can provide a plurality of multi-access edge computing services for itself. The MEC platform mainly has service registration and discovery functions, such as service registration and discovery, and some common services, such as a DNS server or a DNS proxy service, transmission rule control, and DNS resolution.

The virtualization infrastructure provides virtualized computing, storage, and network resources for a multi-access edge computing application.

The multi-access edge computing application (MEC app) is an application that is deployed on the MEC server in a form of a virtual machine or container and can be instantiated on the multi-access edge computing server MEC host in the multi-access edge computing system. The MEC app has potential to provide or consume the multi-access edge computing services.

The multi-access edge computing service (MEC service) is a service provided by the multi-access edge computing platform or a multi-access edge computing application and can be provided for the multi-access edge computing application through an API.

The MEC management system may include:

an MEC orchestrator: configured to maintain an overall view of all multi-access edge computing servers, available resources, and available MEC services in the MEC system, and trigger application instantiation and termination;

an MEC platform manager is configured to manage the MEC platform, a life cycle of a mobile MEC application, and a flow rule and a DNS rule of the application; and a virtualization infrastructure manager configured to manage a virtualized resource required by the MEC application.

The MEC management system may be responsible for operation and maintenance of the MEC application, and maintain content such as a deployment location of the application and information about UE that accesses the application. Alternatively, the multi-access edge computing application may have a corresponding operation and maintenance system. In this embodiment of this application, the multi-access edge computing application is described as an application operation and maintenance system, and the application operation and maintenance system maintains the deployment location of the application and the information about the UE that accesses the application. The application operation and maintenance system may provide some support capabilities for application instances associated with the application operation and maintenance system, to better support application deployment in a DN. The DN includes an application instance and an MEC server. The application instance associated with the MEC server may include: an application instance registered with the MEC server, which usually has been instantiated and has not started to provide a service for a client; or an application instance that is configured by a management system or an application operation and maintenance system on the MEC server, where an application installation package of the application instance has been configured on the MEC server but has not been instantiated; or an application instance running on the MEC server, which usually has provided a service for a client; or an application instance that has not been deployed but can be deployed on the MEC server.

An application may be deployed in a plurality of edge data networks to provide undifferentiated services for clients. An application instance deployed in each edge data network needs to be deployed based on a volume of access traffic. To reduce a latency, the application instance needs to be deployed on an edge node required in the edge data network. Usually, the application instance runs on a virtual machine in a data center. Due to a mobility feature of the terminal apparatus, a server end (namely, the application instance) that provides an application service for an application client on the terminal apparatus may be transferred from one edge data network to another edge data network. In the conventional technology, the terminal can determine, only when the terminal has accessed an application instance deployed on an edge node, whether more application instances need to be deployed or capacity expansion of application instances needs to be performed. Consequently, capacity expansion of applications may not be performed or more application instances may not be deployed in a timely manner, the application instance is overloaded, and application availability is affected.

Figure 5A:
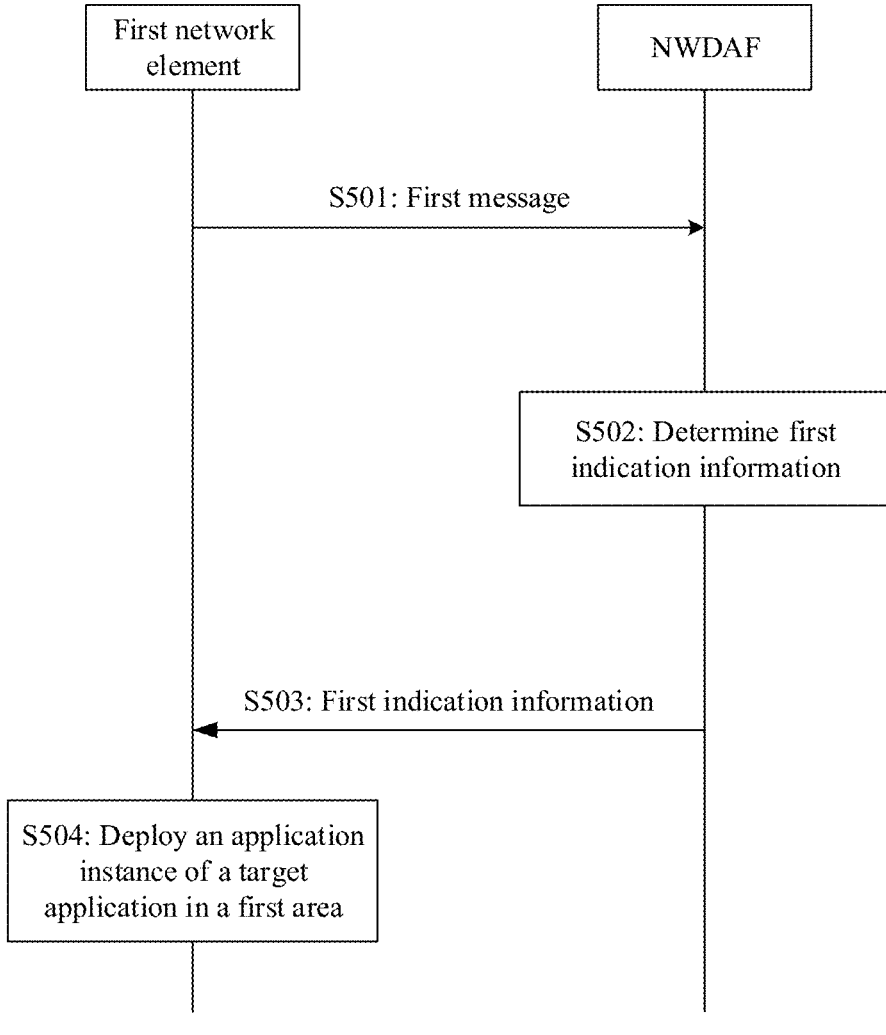
FIG. 5A and FIG. 5B are schematic flowcharts of application instance deployment methods according to this application.

Based on the foregoing problem, an embodiment of this application provides an application instance deployment method. FIG. 5A is a schematic flowchart of an application instance deployment method according to an embodiment of this application. The method includes the following operations.

Operation 501: A first network element sends a first message to a data analysis network element.

The first message includes indication information used to indicate a first area, and the first message is used to request to obtain the first indication information. Correspondingly, the data analysis network element receives the first message from the first network element.

Operation 502: The data analysis network element determines the first indication information.

The first indication information is used to indicate prediction information of a terminal device accessing an application instance of a target application in the first area.

For example, the first indication information may include at least one of the following: a predicted quantity of terminal devices accessing the application instance of the target application in the first area; a predicted quantity of terminal devices that are to leave the first area and that are in the terminal device accessing the application instance of the target application in the first area; and a predicted quantity of terminal devices that are to enter the first area and access the application instance of the target application.

Operation 503: The data analysis network element sends the first indication information to the first network element.

Correspondingly, the first network element may receive the first indication information sent by the data analysis network element.

Operation 504: The first network element deploys the application instance of the target application in the first area based on the first indication information.

For operation 501, in one embodiment, the first message may be sent to the data analysis network element through subscription, or the first network element may send the first message to the data analysis network element through a request.

The first network element may be an AF, or NFs, or an AF and NFs. The first message may carry parameters such as an application identifier of the application instance of the target application, the indication information used to indicate the first area, and a predicted time range (for example, a first time period). The indication information used to indicate the first area may include one or more of the following: a cell identifier of a cell in the first area, a list of cell identifiers of a plurality of cells in the first area, an identity (Tracking Area Identity, TAI) of one or more tracking areas (TAs) in the first area, a list of identities of one or more tracking areas in the first area, a geographical location identifier of the first area (for example, a coordinate or an area including a plurality of coordinates), an administrative region identifier of the first area (for example, XX Road, XX Street, Pudong New District, Shanghai Municipality), or the like.

For example, the indication information used to indicate the first area in operation 501 may carry an identifier of one or more cells, and further the first message is used to request prediction information of a terminal device in the one or more cells. Alternatively, the indication information used to indicate the first area carries an identity of one or more tracking areas, and further the first message is used to request to obtain prediction information of a terminal device in the one or more tracking areas.

The predicted time range may be prediction information of a future time point (where for example, the time point is carried in the first message), or may be prediction information of a time period backward from a current moment (where for example, the time period is carried in the first message).

It should be noted that, if the first network element is a trusted network element in a core network, the first network element may directly send the first message to the data analysis network element, and correspondingly the data analysis network element may directly receive the first message sent by the first network element; and the data analysis network element may directly send the first indication information to the first network element, and correspondingly the first network element may directly receive the first indication information from the data analysis network element.

If the first network element is an untrusted network element in a core network, the first network element may send the first message to the data analysis network element through an NEF network element, and correspondingly the data analysis network element may receive, through the NEF network element, the first message sent by the first network element; and the data analysis network element may send the first indication information to the first network element through the NEF network element, and correspondingly the first network element may receive the first indication information from the data analysis network element through the NEF network element.

The first message is used to request to obtain the first indication information. Further, the data analysis network element may determine the first area by using the indication information that is carried in the first message and that is used to indicate the first area, and further determine the first indication information based on the application identifier of the application instance of the target application, the indication information used to indicate the first area, and the predicted time range.

For example, when the first network element is an application operation and maintenance system, the application operation and maintenance system may send the first message to the data analysis network element, to request or subscribe to prediction information of UE that is to enter the first area and accesses the application instance of the target application. Alternatively, when the first network element is an MEC platform, the MEC platform may send the first message to the data analysis network element, to request or subscribe to prediction information of UE that is to enter the first area and accesses the application instance of the target application. For another example, when the first network element is an MEC management system, the MEC management system may send the first message to the data analysis network element, to request or subscribe to prediction information of UE that is to be in the first area and accesses the application instance of the target application.

In one embodiment, the first message of the first network element may be received through subscription; or the first network element may send a request to the data analysis network element, so that the data analysis network element receives the first message.

Manner 1 and Manner 2 are used as examples below to describe manners of sending and receiving the first message.

Manner 1: The first message may be a first query request. Operation 501*a* and operation 501*b* below may be included.

Operation 501*a*: The first network element sends the first query request to the data analysis network element, where the first query request is used to request to obtain the prediction information of the terminal device accessing the application instance of the target application in the first area.

Operation 501*b*: The data analysis network element sends a first query response to the first network element, where the first query response includes the prediction information of the terminal device accessing the application instance of the target application in the first area.

Manner 2: The first message may be a first subscription request. Operation 501*a*' and operation 501*b*' below may be included.

Operation 501*a*': The data analysis network element receives the first subscription request sent by the first network element, where the first subscription request is used to obtain the first indication information when a third reporting condition is met.

The third reporting condition includes one or more of the following: a quantity of terminal devices whose locations change and that access an application instance of the target application in a second area is greater than a first preset threshold, a quantity of terminal devices that leave the first area and enter the second area to access the application instance of the target application is greater than a second preset threshold, a quantity of terminal devices that enter the first area and leave the second area to access the application instance of the target application is greater than a third preset threshold, or a reporting periodicity expires.

Operation 501*b*': When a first reporting condition is met, the data analysis network element sends, to the first network element, the prediction information of the terminal device accessing the application instance of the target application in the first area.

For operation 502, in one embodiment, the data analysis network element may determine, based on the terminal device in the second area, the quantity of terminal devices that are to enter the first area. The second area may include one or more cells, or the second area includes one or more tracking areas. The second area may be an area adjacent to the first area. For example, the first area is an area served by a first edge node, and the second area is an area served by a second edge node. In the first area, the terminal device may access the application instance of the target application by using an application instance of the target application deployed on the first edge node. In the second area, the terminal device may access the application instance of the target application by using an application instance of the target application deployed on the second edge node. After the terminal device enters the second area from the first area, the application instance of the target application deployed on the first edge node needs to be migrated to the application instance of the target application deployed on the second edge node, to ensure that the terminal device can still access the application instance of the target application in a process of moving from the second area to the first area. To accurately predict a terminal device that is to enter the first area, the second area in which the terminal device that may enter the first area in a future time period is located at a current moment may be determined based on the first area. For example, the one or more cells included in the second area may be a neighboring cell of one or more cells included in the first area. Assuming that the terminal device is currently located in a neighboring cell B of a cell A included in the first area, in a first time period, the terminal device may enter a neighboring cell C of the neighboring cell B, and the neighboring cell C may be a cell in the first area.

Certainly, the second area may alternatively be determined based on other indication information of the first area. For example, one or more tracking areas adjacent to the first area may be determined as the second area based on one or more tracking areas included in the first area. For another example, an area served by an edge node adjacent to the first edge node may be determined as the second area based on an area that is served by the first edge node and that is included in the first area. Alternatively, the second area adjacent to the first area may be determined based on the geographical location identifier of the first area. That is, the second area is an area indicated by a geographical location adjacent to a geographical location of the first area. Alternatively, the second area adjacent to the first area may be determined based on the administrative region identifier of the first area. That is, the second area is an area indicated by an administrative region adjacent to an administrative region of the first area. This is not limited herein.

In one embodiment, the data analysis network element may send a second message to an operation, administration, and maintenance network element, to obtain indication information used to indicate the second area. In one embodiment, the data analysis network element sends the second message to the operation, administration, and maintenance network element, where the second message includes the indication information used to indicate the first area; the data analysis network element receives network topology information returned by the operation, administration, and maintenance network element, where the network topology information is used to indicate an area adjacent to the first area; and the data analysis network element determines the second area based on the area adjacent to the first area.

For example, the second message may be a second query request. In this case, the data analysis network element may send the second query request to the operation, administration, and maintenance network element, where the second query request includes the indication information used to indicate the first area; and the data analysis network element receives the network topology information returned by the operation, administration, and maintenance network element, where the network topology information may be used to indicate the area adjacent to the first area.

It should be noted that the data analysis network element may determine the first area based on the indication information that is in the first message and that is used to indicate the first area. For example, a location and a range of the first area are determined based on a location of a cell in the first area. Certainly, the location and the range of the first area may alternatively be determined based on an identity of one or more tracking areas included in the first area. Alternatively, the location and the range of the first area are determined based on a geometric area including one or more pieces of coordinate information of the first area. For another example, the location and the range of the first area are determined based on administrative region information of the first area.

Further, the data analysis network element may obtain an identifier of the terminal device accessing the application instance of the target application in the second area, to determine the quantity of terminal devices accessing the application instance of the target application in the second area.

In one embodiment, the method may include: The data analysis network element sends a third message to the first network element, where the third message is used to obtain identifiers of terminal devices accessing the application instance of the target application in the second area, and the third message includes indication information used to indicate the second area; and the data analysis network element receives identifiers that are of N1 terminal devices accessing the application instance of the target application in the second area and that are returned by the first network element.

There may be different embodiments for a method in which the data analysis network element obtains the identifier of the terminal device accessing the application instance of the target application in the second area. The following uses an example in which the first network element is an application function network element, and uses Embodiment a1 and Embodiment b1 as an example for description.

Embodiment a1 may include the following operations.

Operation 1: The data analysis network element sends a third query request to the application function network element, where the third query request includes the indication information used to indicate the second area.

Operation 2: The application function network element returns, to the data analysis network element, an identifier of at least one terminal device accessing the application instance of the target application in the second area. Further, the data analysis network element receives the identifier that is of the at least one terminal device accessing the application instance of the target application in the second area and that is returned by the application function network element.

Embodiment b1 may include the following operations.

Operation 1: The data analysis network element sends a third subscription request to the application function network element, where the third subscription request includes the indication information used to indicate the second area; and a second network element is an application function network element. Operation 1: The first network element receives the third subscription request from the data analysis network element.

Operation 2: When a first reporting condition is met, the first network element returns, to the data analysis network element, an identifier of at least one terminal device accessing the application instance of the target application in the second area; and the data analysis network element receives the identifier that is of the at least one terminal device accessing the application instance of the target application in the second area and that is returned by the application function network element, where the first reporting condition includes one or more of the following: a reporting periodicity expires, a quantity of terminal devices that access the application instance of the target application in the second area and that are subscribed to by the data analysis network element reaches a first reporting threshold, or a quantity of terminal devices accessing the application instance of the target application in the second area changes.

That the quantity of terminal devices accessing the application instance of the target application in the second area changes may be that the terminal device located in the second area starts to access or stops accessing the application instance of the target application, or may be that the terminal device accessing the application instance of the target application leaves or enters the second area. For example, a terminal device 1 accesses the application instance of the target application in the second area, and the terminal device 1 stops accessing the application instance of the target application at a first moment. In this case, that the quantity of terminal devices accessing the application instance of the target application in the second area changes may include: One terminal device accessing the application instance of the target application in the second area is reduced. Alternatively, a terminal device 1 accesses a second application in the second area, and the terminal device 1 stops accessing the second application and starts to access the application instance of the target application at a first moment. In this case, that the quantity of terminal devices accessing the application instance of the target application in the second area changes includes: One terminal device accessing the second application in the second area is reduced, and one terminal device accessing the application instance of the target application in the second area is increased. For another example, a terminal device 1 accesses the application instance of the target application in the second area, and the terminal device 1 moves out of the second area to access the application instance of the target application at a first moment. In this case, that the quantity of terminal devices accessing the application instance of the target application in the second area changes may include: One terminal device accessing the application instance of the target application in the second area is reduced.

Because different network elements use different identifiers of terminal devices, the data analysis network element may need to obtain internal identifiers of the terminal devices from a unified data management network element or a user subscription data management network element, to obtain location information and a quantity of terminal devices in the second area or the first area. For example, the internal identifier of the terminal device may be a subscription permanent identifier (SUPI) or a permanent equipment identifier (PEI). Correspondingly, an external identifier of the terminal device may be a generic public subscription identifier (GPSI), an IP address of the terminal device, or another identifier.

The following uses a method for obtaining the internal identifier of the terminal device accessing the application instance of the target application in the second area as an example for description. For a method for obtaining an internal identifier of the terminal device accessing the application instance of the target application in the first area, refer to this embodiment. Details are not described herein again. In one embodiment, Scenario 1 and Scenario 2 below may be included.

Scenario 1: If the application function network element is a trusted application function network element in the core network, an identifier that is of the terminal device accessing the application instance of the target application in the second area and that is sent by the application function network element to the data analysis network element is the internal identifier of the terminal device.

Scenario 2: If the application function network element is an untrusted application function network element in the core network, the application function network element needs to interact with the data analysis network element through an NEF network element, and an identifier that is of the terminal device accessing the application instance of the target application in the second area and that is sent by the application function network element to the NEF network element is the external identifier of the terminal device. In this case, the NEF network element needs to request a unified data management network element or a user subscription data management network element to obtain a corresponding internal identifier of the terminal device. In this way, when forwarding, to the data analysis network element, the identifier that is of the terminal device accessing the application instance of the target application in the second area and that is sent by the application function network element, the NEF network element may convert the identifier of the terminal device into the internal identifier of the terminal device accessing the application instance of the target application in the second area.

In Scenario 2, one embodiment may include the following operations.

Operation 5021a: The data analysis network element sends a fourth query request to the application function network element through the NEF network element, where the fourth query request includes the indication information used to indicate the second area.

Operation 5022a: The application function network element returns, to the NEF network element, an external identifier of at least one terminal device accessing the application instance of the target application in the second area.

In one embodiment, the external identifier of the at least one terminal device may be in a form of a list of identifiers, or may be in another form. This is not limited herein.

Operation 5023a: The NEF network element sends an internal identifier query request to the unified data management network element or the user subscription data management network element, where the internal identifier query request includes an external identifier of one or more terminal devices accessing the application instance of the target application in the second area.

For example, the external identifier of the one or more terminal devices accessing the application instance of the target application in the second area may be a list of external identifiers of the terminal devices accessing the application instance of the target application in the second area. Certainly, the external identifier may be sent in another form. This is not limited herein.

Operation 5024a: The unified data management network element or the user subscription data management network element returns, to the NEF network element, an internal identifier of the one or more terminal devices accessing the application instance of the target application in the second area.

Operation 5025a: The NEF network element sends, to the data analysis network element, the internal identifier of the at least one terminal device accessing the application instance of the target application in the second area.

Operation 5026a: The data analysis network element receives the internal identifier that is of the one or more terminal devices accessing the application instance of the target application in the second area and that is sent by the NEF network element.

In Scenario 2, one embodiment may include the following operations.

Operation 5021b: The data analysis network element sends a fourth subscription request to the application function network element through the NEF network element, where the fourth subscription request includes the indication information used to indicate the second area.

Operation 5022b: When the first reporting condition is met, the application function network element sends, to the NEF network element, an external identifier of one or more terminal devices accessing the application instance of the target application in the second area.

For example, the external identifier of the one or more terminal devices accessing the application instance of the target application may be a list of the external identifier of the terminal devices accessing the application instance of the target application in the second area. Certainly, the external identifier may be sent in another form. This is not limited herein.

Operation 5023b: The NEF network element sends an internal identifier query request to the unified data management network element or the user subscription data management network element, where the internal identifier query request includes the external identifier of the one or more terminal devices accessing the application instance of the target application in the second area.

Operation 5024b: The unified data management network element or the user subscription data management network element returns, to the NEF network element, an internal identifier of the one or more terminal devices accessing the application instance of the target application in the second area.

Operation 5025b: The NEF network element sends, to the data analysis network element, the internal identifier of the one or more terminal devices accessing the application instance of the target application in the second area.

Operation 5026b: The data analysis network element receives the internal identifier that is of the one or more terminal devices accessing the application instance of the target application in the second area and that is sent by the NEF network element.

Further, the data analysis network element may obtain, based on the identifier of the terminal device accessing the application instance of the target application in the second area, location information of the terminal device accessing the application instance of the target application in the second area. For a manner of obtaining the location information of the terminal device accessing the application instance of the target application in the second area, Embodiment a2 and Embodiment b2 below are used as an example for description.

Embodiment a2 includes:

Operation 1: The data analysis network element sends a fifth query request to an access and mobility management function network element.

The fifth query request includes the internal identifier of the terminal device accessing the application instance of the target application in the second area.

The terminal device may be one of the at least one terminal device accessing the application instance of the target application in the second area.

Operation 2: The data analysis network element receives the location information of the terminal device from the access and mobility management function network element.

Embodiment b2 includes:

Operation 1: The data analysis network element sends a fifth subscription request to an access and mobility management function network element.

A location information subscription message of the terminal device accessing the application instance of the target application in the second area includes the internal identifier of the at least one terminal device accessing the application instance of the target application in the second area.

Operation 2: The access and mobility management function network element sends the location information of the terminal device to the data analysis network element when a second reporting condition is met. Further, the data analysis network element receives the location information of the terminal device from the access and mobility management function network element.

The second reporting condition includes one or both of the following: a location of the terminal device changes, or a reporting periodicity expires.

In one embodiment, a method for determining, by the data analysis network element, that UE is located in the second area may be: determining based on a cell in which the UE is located in the second area. For example, the data analysis network element may send a subscription message to all RANs in a network, to subscribe to cell change information of the UE. After the RANs receive the subscription message, if the UE is in an area covered by the RANs, the RANs send a message to the data analysis network element, to notify of the cell in which the UE is located. Subsequently, if the cell in which the UE is located changes, the RANs may immediately notify the data analysis network element of the cell in which the UE is located, or periodically notify the data analysis network element of the cell in which the UE is located. If the UE is originally not in the area covered by the RANs but enters the area later, the RANs also need to notify the data analysis network element of the cell in which the UE is located.

Further, the data analysis network element may obtain location change information of the terminal device accessing the application instance of the target application in the second area. A manner of obtaining the location change information of the terminal device accessing the application instance of the target application in the second area may include:

Operation 1: The NWDAF subscribes, from the AF, to a change event of the UE accessing the application instance of the target application in the second area.

Operation 2: When a fourth reporting condition is met, the AF sends the location change information of the terminal device to the data analysis network element. The location change information of the terminal device may include an identifier and an online/offline identifier of the UE.

For example, the fourth reporting condition may include: New UE accesses the application instance of the target application in the second area, or the UE accessing the application instance of the target application in the second area goes offline. In this way, the NWDAF can determine, based on whether the UE goes online or offline in the second area and whether the UE goes online or offline in the first area, whether the location of the UE changes. For example, if the second area is a neighboring area of the first area, if it is determined that UE 1 accessing the application instance of the target application in the second area goes offline, and the UE 1 accessing the application instance of the target application in the first area goes online, it may be determined that the UE 1 moves from the second area to the first area.

Further, if the UE goes online, the NWDAF may subscribe to a location information change event of the UE from the AMF. If the UE goes offline, the NWDAF unsubscribes from a location information change event of the UE from the AMF. In this way, the NWDAF obtains a change of the location information of the UE in a timely manner.

The following provides an example in which the data analysis network element may determine, based on the location information of the terminal device accessing the application instance of the target application in the second area, that the UE is to enter the second area.

In one embodiment, the data analysis network element obtains N1 terminal devices accessing the application instance of the target application in the second area. The data analysis network element obtains location information of a terminal device in the N1 terminal devices. The data analysis network element analyzes the location information of the terminal device in the N1 terminal device, and predicts, from the N1 terminal devices, N2 terminal devices that are to enter the first area.

Embodiment 1, the data analysis network element obtains the location information of the terminal device from a second network element, where the location information of the terminal device is information about the second area. The data analysis network element determines a movement track of the terminal device based on the location information of the terminal device and historical location information of the terminal device, where the movement track is used to indicate a movement direction of the terminal device and a location that the terminal device passes through during movement. The data analysis network element determines, based on the movement track and a network topology structure, information about the first area that the terminal device is to enter, where the network topology structure is used to indicate a distribution location of each cell in the network, and each cell belongs to the first area or the second area.

For example, the data analysis network element obtains location information of UE from an AMF or a RAN corresponding to the first area, where the location information of the UE is the information about the first area. The data analysis network element determines a movement track of the UE based on the location information of the UE and historical location information of the UE, where the movement track is used to indicate a movement direction of the UE and a location that the UE passes through during movement, and, in one embodiment, the movement track is further used to indicate a movement speed of the UE. The data analysis network element determines, based on the movement track and a network topology structure, information about the second area that the UE is to enter, where the network topology structure is used to indicate a distribution location of each cell in the network, and each cell includes the first area and the second area. That is, the data analysis network element obtains current location information of the UE, and determines the movement track of the UE based on the current location information of the UE and previously obtained historical location information of the UE, to determine, based on the movement track and the network topology structure, information about a next cell that the UE is to enter, namely, the information about the second area in this application. The "movement track of the UE" herein refers to a list of cells that the UE passes through during movement. In this embodiment, the information about the next cell that the UE is to enter may be predicted at a cell granularity.

Embodiment 2: The data analysis network element obtains a measurement report (MR) of the UE from a RAN corresponding to the first area. The data analysis network element determines latitude and longitude information of the UE based on the measurement report of the UE. The data analysis network element determines a movement track of the UE based on the latitude and longitude information of the UE and the latitude and longitude information of the UE, where the movement track is used to indicate a movement direction of the UE and a location that the UE passes through during movement, and, in one embodiment, the movement track is further used to indicate a movement speed of the UE. The data analysis network element determines, based on the movement track and a network topology structure, the second area that the UE is to enter, where the network topology structure is used to indicate a distribution location of each cell in the network, and each cell includes the first area and the second area. That is, the data analysis network element determines the latitude and longitude information of the UE by obtaining the measurement report of the UE, determines the movement track of the UE based on the latitude and longitude information of the UE and previously obtained historical latitude and longitude information of the UE, to determine, based on the movement track and the network topology structure, information about a next cell that the UE is to enter, namely, the information about the second area in this application. In this embodiment, the information about the next cell that the UE is to enter may be predicted at a latitude and longitude granularity. Compared with embodiment 1, this embodiment can provide more accurate prediction.

In one embodiment, the data analysis network element may obtain the measurement report of the UE from the RAN corresponding to the second area by using the following method: The data analysis network element sends a subscription message to the RAN corresponding to the second area, where the subscription message is used to request to subscribe to the measurement report of the UE; and when a fifth reporting condition is met, the RAN sends the measurement report of the UE to the data analysis network element, where the fifth reporting condition includes one or both of the following: the RAN corresponding to the second area receives the measurement report of the UE, or a reporting periodicity expires. In one embodiment, the measurement report of the UE includes one or more of the following: reference signal received power (RSRP), reference signal received quality (RSRQ), a signal-to-noise ratio (SNR), throughput of the UE, or channel state information (CSI).

Based on Embodiment 1 or Embodiment 2, the data analysis network element may determine the location information or the latitude and longitude information of the UE by subscribing to the location information or the measurement report of the UE, to draw the movement track of the UE, and predict, based on the movement track, the information about the next cell that the UE is to enter. Further, the movement direction and the movement speed of the UE may be predicted, so that time for entering the next cell may be predicted.

Similarly, the data analysis network element may further obtain M1 terminal devices accessing the application instance of the target application in the first area. The data analysis network element obtains location information of a terminal device in the M1 terminal devices; and analyzes the location information of the terminal device in the M1 terminal devices, and predicts, from the M1 terminal devices, a quantity of terminal devices that are to leave the first area and that are in the terminal devices accessing the application instance of the target application in the first area. For a determining manner, refer to the method for predicting, based on the N1 terminal devices accessing the application instance of the target application in the second area and the location information of the N1 terminal devices, the N2 terminal devices that are to enter the first area. Details are not described herein again.

Based on operation 502, the first network element may obtain the prediction information of the terminal device in the second area from the data analysis network element, so that the first network element can effectively deploy the application instance.

With reference to operation 501, for operation 503, In one embodiment, the first indication information may be sent to the first network element through subscription, or a response message of the first message may be returned to the first network element after the first message is received, so that the first network element receives the first indication information. For example, the manner of subscription may include the following operations.

Operation 503a': The data analysis network element receives the first subscription request sent by the first network element, where the first subscription request is used to obtain the first indication information when a third reporting condition is met.

The third reporting condition includes one or more of the following: a quantity of terminal devices whose locations change and that access the application instance of the target application is greater than a first preset threshold, a quantity of terminal devices that leave the first area and access the application instance of the target application is greater than a second preset threshold, a quantity of terminal devices that enter the first area and access the application instance of the target application is greater than a third preset threshold, or a reporting periodicity expires.

The first indication information may further include one or more of the following:

the quantity of terminal devices accessing the application instance of the target application in the second area, the identifier of the terminal device accessing the application instance of the target application in the second area, the location information of the terminal device accessing the application instance of the target application in the second area, the location change information of the terminal device accessing the application instance of the target application in the second area, the estimated quantity of terminal devices that enter the first area and access the application instance of the target application, or the estimated quantity of terminal devices that leave the first area and access the application instance of the target application.

Operation 503b': The data analysis network element sends the first indication information to the first network element when the third reporting condition is met.

When the quantity of terminal devices in the first area and/or the prediction information of the terminal device are/is subscribed to in operation 501, reporting may be triggered in one or both of the following manners:

(1) When the quantity of terminal devices in the area and/or the prediction information of the terminal device are/is obtained for the first time, the quantity of terminal devices and/or the prediction information of the terminal device are/is reported to the AF/NFs; or when it is predicted that the UE is to enter one or more new cells, the quantity of terminal devices in the cell and/or the prediction information of the terminal device are/is reported to the AF/NFs in advance.

(2) When the quantity of terminal devices in the area and/or the prediction information of the terminal device change/changes across a threshold, the quantity of terminal devices and/or the prediction information of the terminal device are/is reported to the AF/NFs.

When the quantity of terminal devices corresponding to "a movement track of UE (or a UE group)" is subscribed to in operation 501, reporting may be triggered in one or more of the following manners:

(1) An initially obtained quantity of terminal devices in the cell in which the UE is located is reported to the AF/NFs.

(2) When the UE enters a new cell, the UE reports the quantity of terminal devices in the cell to the AF/NFs.

(3) Subsequently, when the UE stays in the cell, if the terminal device in the cell changes across a threshold, the UE reports the change to the AF/NFs, or periodically reports the change to the AF/NFs.

When the prediction information of the terminal device "in an area corresponding to a movement track of UE (or a UE group)" is subscribed to in operation 501, reporting may be triggered in one or more of the following manners:

(1) For a next cell that the UE is to enter, a time point at which the UE enters the next cell and prediction information of the terminal device corresponding to the time point are reported.

(2) Subsequently, before the UE enters the "next cell", if the prediction information of the terminal device in the cell changes across a threshold, the changed prediction information of the terminal device is reported to the AF/NFs.

(3) Subsequently, if the predicted "next cell" changes, that is, a prediction result is corrected, a time point of entering a new "next cell" and prediction information of the terminal device corresponding to the time point need to be reported to the AF/NFs.

The NWDAF reports, to the NFs, the quantity of terminal devices and/or the prediction information of the terminal device of the subscribed network element, and the NFs may be configured to adjust deployment of the application instance of the target application, or the like.

Figure 5B:
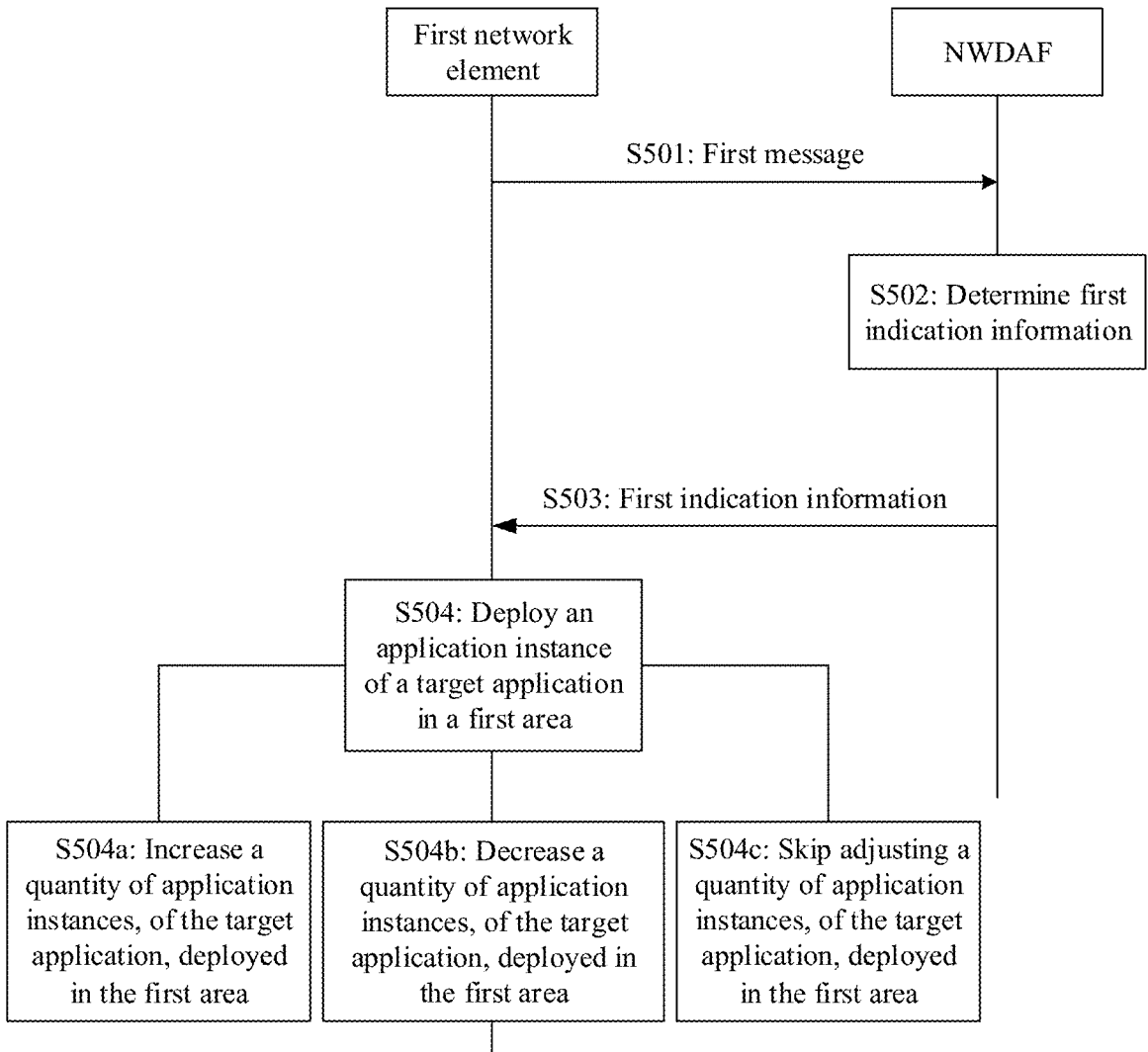

In operation 504, as shown in FIG. 5B, In an embodiment, the following operations may be included. Operation 504a: If the first network element determines, based on the first indication information, that the predicted quantity of terminal devices in the first area is greater than a first threshold, the first network element correspondingly increases the quantity of application instances of the target application in the first area. Operation 504b: If the first network element determines, based on the first indication information, that the predicted quantity of terminal devices in the first area is less than a second threshold, the first network element correspondingly decreases the quantity of application instances of the target application in the first area. Operation 504c: If the first network element determines, based on the first indication information, that the predicted quantity of terminal devices in the first area is less than or equal to a first threshold, and/or that the predicted quantity of terminal devices in the first area is greater than or equal to a second threshold, the first network element skips adjusting the quantity of application instances of the target application in the first area. In this case, the first threshold is greater than the second threshold.

For example, if the prediction information indicated in the first indication information is the predicted total quantity of terminal devices accessing the application instance of the target application in the first area, the first threshold may be determined based on a total quantity of terminal devices that can be carried by the application instance, of the target application, deployed in the first area. For example, if it is determined that a total quantity of terminal devices that can be carried by the application instance of the target application currently deployed in the application instance of the target application in the first area is 100, the first threshold may be set to 100. When the predicted total quantity of terminal devices accessing the application instance of the target application in the first area exceeds 100, it is determined that capacity expansion of the application instance, of the target application, deployed in the application instance of the target application in the first area needs to be performed. The second threshold may be determined based on a quantity of redundant terminal devices that can be accepted and a total quantity of terminal devices that can be carried by the application instance, of the target application, deployed in the application instance of the target application in the first area. For example, if it is determined that a current total quantity of terminal devices that can be carried by the application instance, of the target application, deployed in the application instance of the target application in the first area is 100, and a quantity of redundant terminal devices that can be accepted is 10, the second threshold may be 90. That is, when the predicted total quantity of terminal devices accessing the application instance of the target application in the first area is less than 90, it is determined that capacity reduction of the application instance, of the target application, deployed in the first area needs to be performed. Certainly, the first threshold and the second threshold may alternatively be set in another manner. This is not limited herein.

For another example, if the prediction information indicated in the first indication information is the predicted quantity of terminal devices that are to enter the first area and access the application instance of the target application, the first threshold may be determined based on a quantity of increased terminal devices that can be carried by an application instance, of the target application, deployed in the application instance of the target application in the first area. For example, if it is determined that the quantity of increased terminal devices that can be carried by the application instance of the target application currently deployed in the application instance of the target application in the first area is 10, the first threshold may be set to 10. When the predicted quantity of terminal devices that are to enter the first area and access the application instance of the target application exceeds 10, it is determined that capacity expansion of the application instance, of the target application, deployed in the application instance of the target application in the first area needs to be performed.

Certainly, the prediction information indicated in the first indication information may further include the predicted quantity of terminal devices that are to enter the first area and access the application instance of the target application and the predicted quantity of terminal devices that are to leave the first area and access the application instance of the target application. In this case, when the predicted quantity of terminal devices that are to enter the first area and access the application instance of the target application and the predicted quantity of terminal devices that are to leave the first area and access the application instance of the target application exceed 10, it is determined that capacity expansion of the application instance, of the target application, deployed in the application instance of the target application in the first area needs to be performed.

For example, if the prediction information indicated in the first indication information is the predicted quantity of terminal devices that are to leave the first area and access the application instance of the target application, the second threshold may be determined based on the quantity of redundant terminal devices that can be accepted by the application instance, of the target application, deployed in the application instance of the target application in the first area. If it is determined that the application instance of the target application currently deployed in the application instance of the target application in the first area can accept 10 redundant terminal devices, the second threshold may be 10. In one embodiment, when a difference between the predicted quantity of terminal devices that are to leave the first area and access the application instance of the target application and the predicted quantity of terminal devices that are to enter the first area and access the application instance of the target application is greater than 10, it is determined that capacity reduction of the application instance, of the target application, deployed in the first area needs to be performed.

The following describes, based on different scenarios of the first network element, a method for deploying the application instance of the target application in the first area by the first network element. The first network element may deploy the application instance of the target application in the first area in the following three manners based on the first indication information.

Manner 1: As shown in FIG. 4B, the first network element is an application operation and maintenance system, and the application operation and maintenance system is configured to manage the application instance of the target application deployed on the MEC edge node. After receiving the first indication information from the data analysis network element in the core network, the application operation and maintenance system determines whether the quantity of application instances, of the target application, deployed in the first area needs to be adjusted. If determining that the quantity of application instances of the target application needs to be adjusted, the application operation and maintenance system may send a message to the MEC management system. The message is used to request to adjust the quantity of application instances of the target application, that is, perform capacity expansion or reduction on an existing application instance of the target application. Further, the application operation and maintenance system indicates, through the MEC management system, the MEC edge node to adjust the quantity of the target application instance.

Figures 4C, 4D:
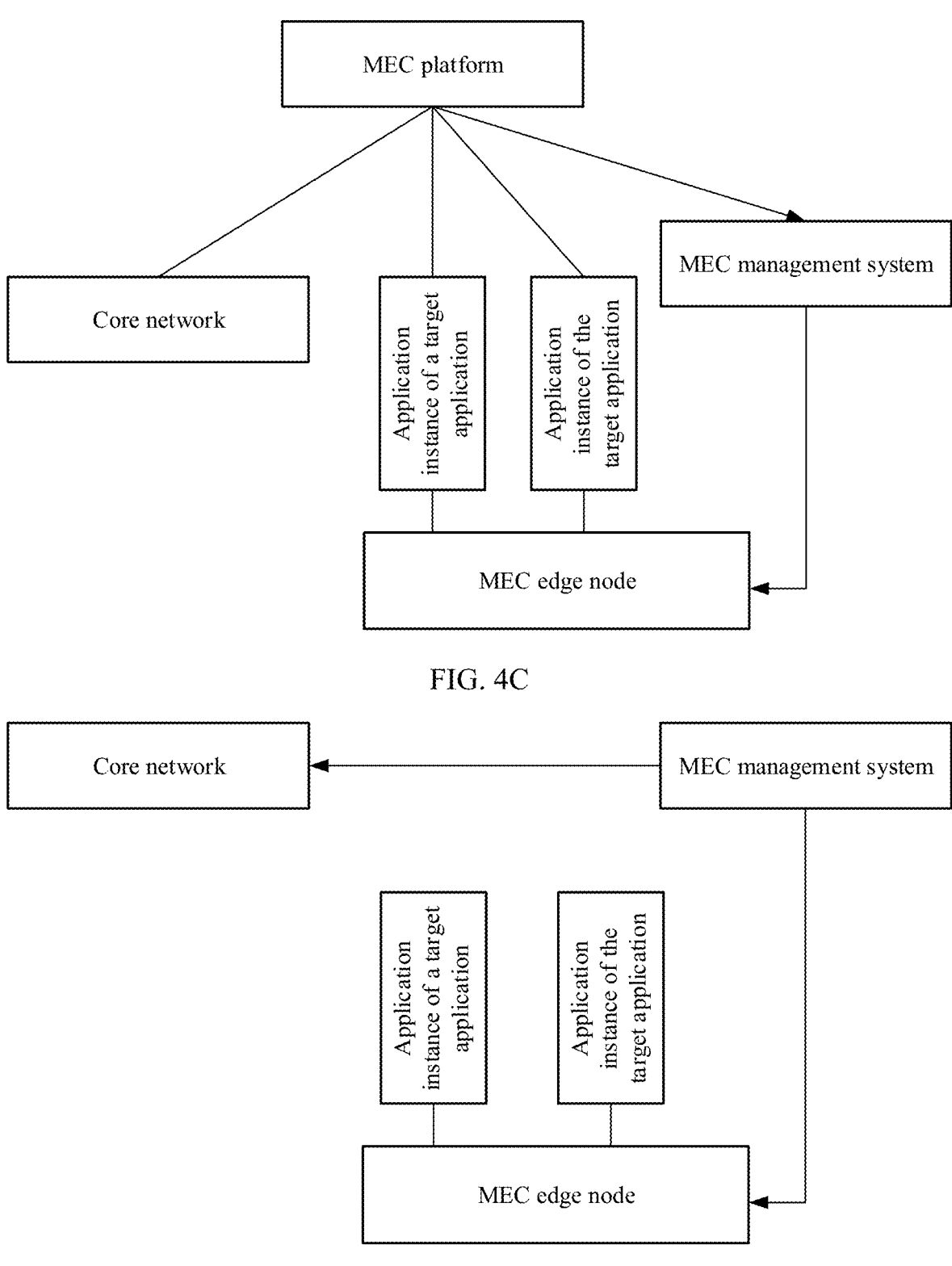

Manner 2: As shown in FIG. 4C, the first network element is an MEC platform, and the MEC platform is configured to manage the application instance of the target application deployed on the MEC edge node. After receiving the first indication information from the data analysis network element in the core network, the MEC platform determines whether the quantity of application instances, of the target application, deployed in the first area needs to be adjusted. If determining that the quantity of application instances of the target application needs to be adjusted, the MEC platform may send a message to the MEC management system.

The message is used to request to adjust the quantity of application instances of the target application. Further, the MEC platform indicates, through the MEC management system, the MEC edge node to adjust the quantity of application instances of the target application.

Manner 3: As shown in FIG. 4D, the first network element is an MEC management system, and the MEC management system is configured to manage the application instance of the target application deployed on the MEC edge node. After receiving the first indication information from the data analysis network element, the MEC management system determines whether the quantity of application instances, of the target application, deployed in the first area needs to be adjusted. If determining that the quantity needs to be adjusted, the MEC management system indicates the MEC edge node to adjust the quantity of application instances of the target application, to adjust the quantity of application instances, of the target application, deployed in the first area.

For an adjustment manner, refer to the solution in operation 504. Details are not described herein again.

Figure 6:
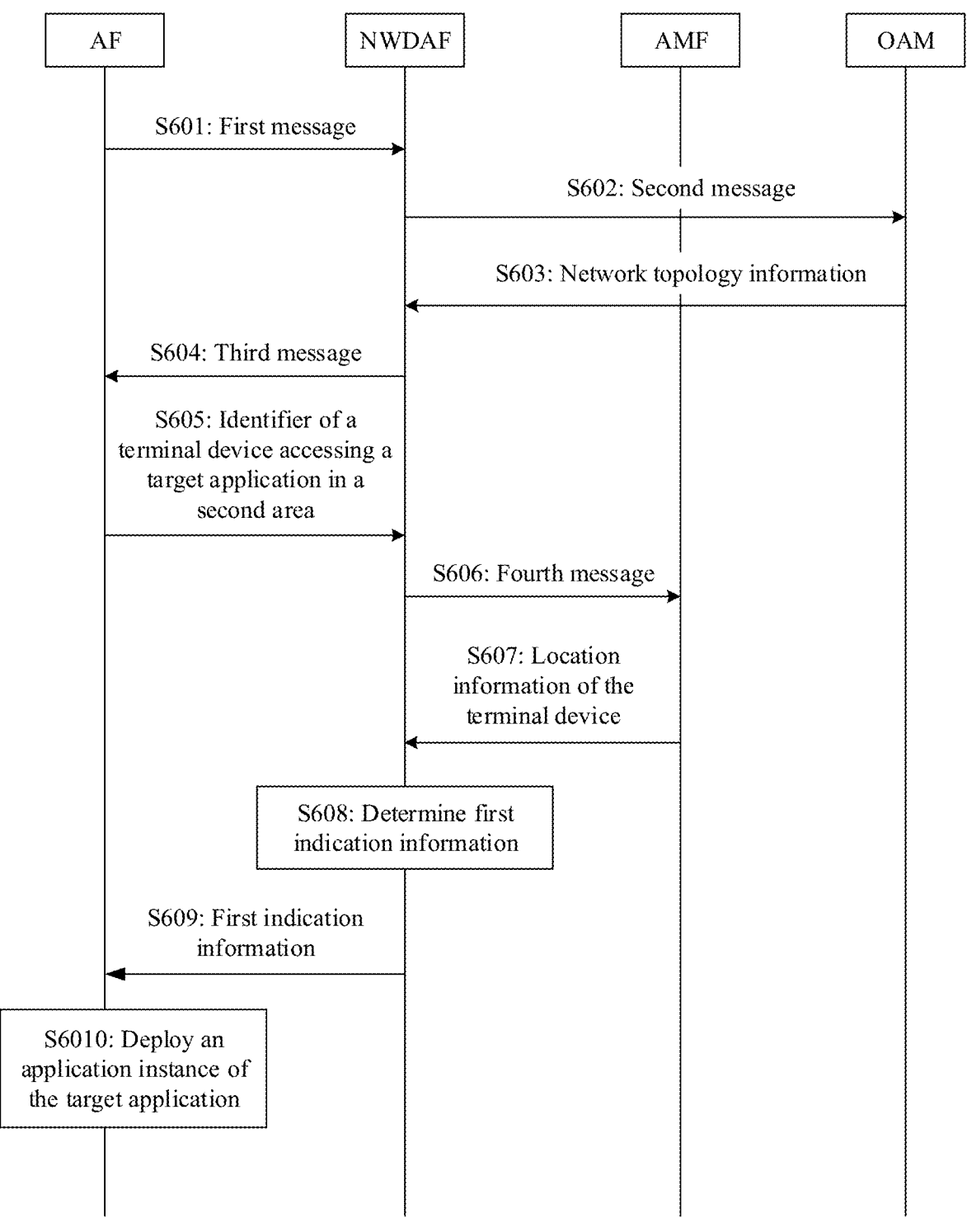
FIG. 6 is a schematic flowchart of an application instance deployment method according to this application.

In the following, the data analysis network element is an NWDAF (also referred to as a network data analysis function), the first network element is an AF/NFs in a core network, and the AF may directly interact with the NWDAF. A method is provided by using an example in which the second network element is 5GC NFs. The AF in the procedure may be an application management system, or may be a component of an MEC management system. FIG. 6 is a schematic flowchart of another application instance deployment method according to this application. The method includes the following operations.

Operation 601: An AF sends a first message to an NWDAF.

The first message is used to request to obtain first indication information. In one embodiment, the first message may carry parameters such as an application identifier of an application instance of a target application, indication information used to indicate a first area, and a predicted time range.

Correspondingly, the NWDAF receives the first message sent by the AF.

Operation 602: The NWDAF sends a second query request to an OAM.

The second query request is used to obtain network topology information of a second area, where the network topology information includes location information of the second area that is used to indicate a location indicated by the indication information of the first area.

Operation 603: The OAM sends a network topology information query response of the second area to the NWDAF.

The network topology information query response of the second area includes the network topology information of the second area, and the network topology information includes indication information used to indicate an area adjacent to the first area.

Operation 604: The NWDAF sends a third message to the AF.

In one embodiment, the NWDAF sends a third query request to the AF, to obtain a list of identifiers of UEs accessing the application instance of the target application in the second area.

In one embodiment, the NWDAF sends a third subscription request to the AF, so that when a first reporting condition is met, the AF sends an identifier of at least one terminal device accessing the application instance of the target application in the second area. The first reporting condition includes one or more of the following: a reporting periodicity expires, a quantity of terminal devices that access the application instance of the target application in the second area and that are subscribed to by a data analysis network element reaches a first reporting threshold, or a quantity of terminal devices accessing the application instance of the target application in the second area changes.

Operation 605: The AF sends, to the NWDAF, the identifier of the at least one terminal device accessing the application instance of the target application in the second area.

In one embodiment, the AF sends, to the NWDAF, a query response of the identifier of the terminal device accessing the application instance of the target application in the second area, where the query response includes the list of identifiers of the UEs accessing the application instance of the target application in the second area.

In one embodiment, when the first reporting condition is met, the AF sends the identifier of the at least one terminal device accessing the application instance of the target application in the second area.

It should be noted that because the AF is a trusted AF in a core network, the identifier that is of the terminal device accessing the application instance of the target application in the second area and that is sent by the AF to the NWDAF is an internal identifier of the terminal device.

Operation 606: The NWDAF sends a fourth message to an AMF.

In one embodiment, the NWDAF sends a fifth query request to the AMF, where the fifth query request is used to subscribe to location information of a terminal device whose location changes in the terminal devices accessing the application instance of the target application in the second area, and the fifth query request carries the internal identifier of the terminal device accessing the application instance of the target application in the second area.

In one embodiment, the NWDAF may send a fifth subscription request to the AMF, where the fifth subscription request is used to subscribe to location information of a terminal device whose location changes in the terminal devices accessing the application instance of the target application in the second area, and the fifth subscription request carries the internal identifier of the terminal device accessing the application instance of the target application in the second area.

Operation 607: The AMF sends, to the NWDAF, the location information of the terminal device whose location changes in the terminal devices accessing the application instance of the target application in the second area.

In one embodiment, the AMF sends a fifth query response to the NWDAF. In one embodiment, the fifth query response includes the location information of the terminal device whose location changes in the terminal devices accessing the application instance of the target application in the second area.

In one embodiment, when a second reporting condition is met, the AMF sends, to the NWDAF, the location information of the terminal device whose location changes in the terminal devices accessing the application instance of the target application in the second area. For example, when the location of the terminal device accessing the application instance of the target application in the second area changes, the AMF sends, to the NWDAF, a location change notification message of the terminal device.

Operation 608: The NWDAF determines the first indication information.

For example, when the first indication information includes a predicted quantity of terminal devices that are to enter the first area and access the application instance of the target application, the NWDAF may predict, based on the location information of the UE that is reported by the AMF, whether the UE is to enter the first area. In one embodiment, the NWDAF may determine the location information of the UE, namely, information about a cell in which the UE is located, based on the location information of the UE that is reported by the AMF. Alternatively, the NWDAF may determine latitude and longitude information of the UE based on an obtained measurement report of the UE. Further, the NWDAF may further draw a movement track of the UE at a cell granularity or a latitude and longitude granularity based on historical location information (a cell or latitude and longitude) of the UE and the location information of the UE, and may further obtain a movement direction and speed of the UE. The predicted movement direction and speed of the UE may be represented as: predicting a next cell that the UE enters and a time point at which the UE enters.

Operation 609: The NWDAF sends the first indication information to the AF.

The first indication information may carry the predicted quantity of terminal devices. In one embodiment, the first indication information may further carry a predicted list of external identifiers of the terminal devices, to meet a requirement of the AF. Further, to avoid repeatedly sending prediction information of the terminal device to the first network element, the NWDAF may collect statistics about a prediction and analysis result, and send the first indication information to the first network element when a third reporting condition is met. The third reporting condition includes one or more of the following: a quantity of terminal devices whose locations change and that access the application instance of the target application is greater than a first preset threshold, a quantity of terminal devices that leave the first area and access the application instance of the target application is greater than a second preset threshold, a quantity of terminal devices that enter the first area and access the application instance of the target application is greater than a third preset threshold, or a reporting periodicity expires.

Operation 6010: The AF deploys the application instance of the target application in the first area based on the first indication information.

Figure 7:
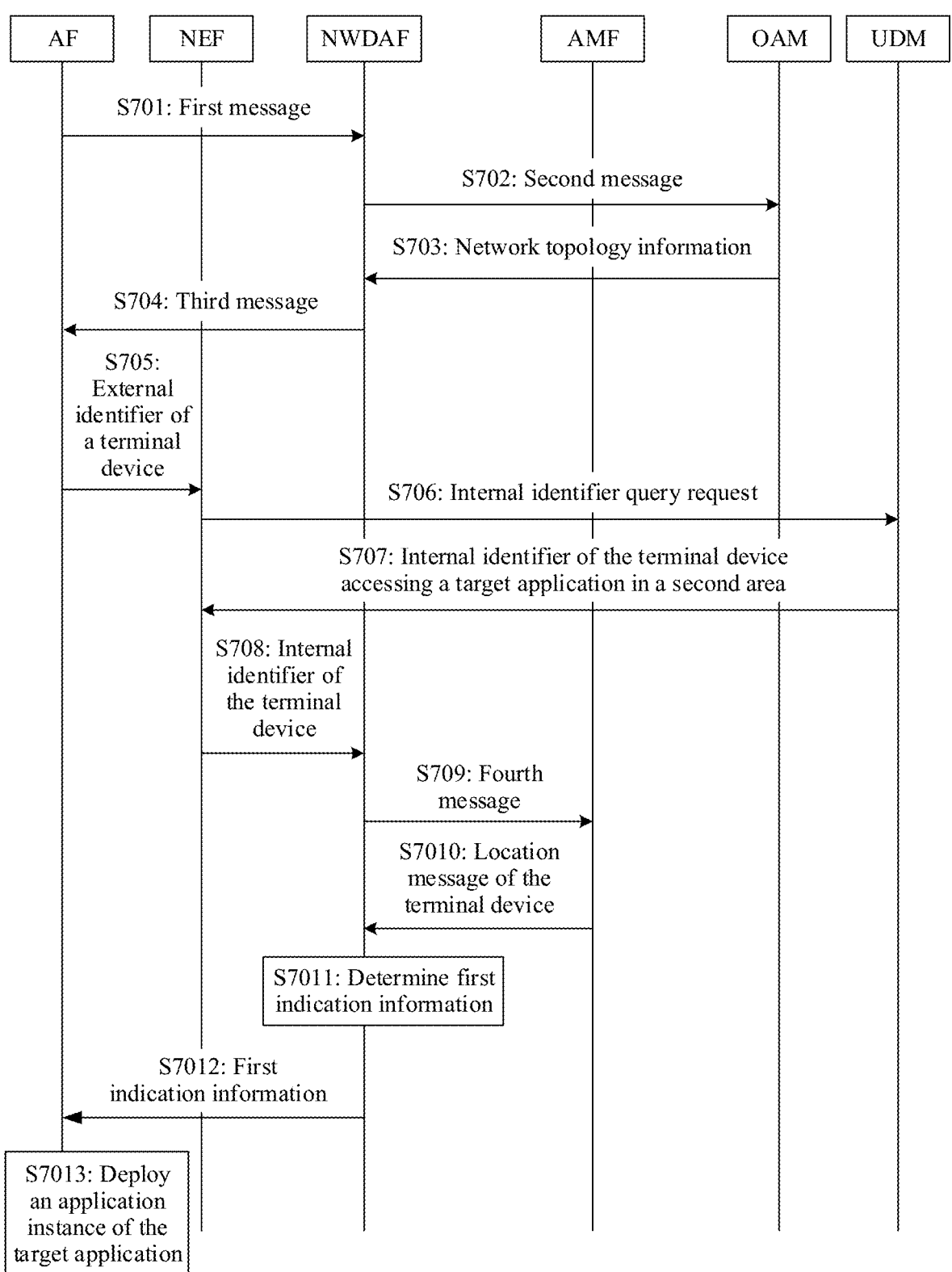
FIG. 7 is a schematic flowchart of another application instance deployment method according to this application.

The data analysis network element is an NWDAF (also referred to as a network data analysis function), the first network element is an AF/NFs outside a core network, and the AF needs to interact with the NWDAF through a network exposure function NEF. In one embodiment, the second network element is 5GC NFs. The AF in the procedure may be an application management system, or may be a component of an MEC management system. FIG. 7 is a schematic flowchart of another application instance deployment method according to this application. The method includes the following operations.

Operation 701: An AF sends a first message to an NWDAF through a network exposure function NEF.

The first message is used to request to obtain first indication information. In one embodiment, the first message may carry parameters such as an application identifier of an application instance of a target application, indication information used to indicate a first area, and a predicted time range.

Correspondingly, the NWDAF receives, through the network exposure function NEF, the first message sent by the AF.

Operation 702: The NWDAF sends a second message to an OAM.

The second message is used to obtain indication information used to indicate a second area.

Operation 703: The OAM returns network topology information to the NWDAF.

The network topology information is used to indicate an area adjacent to a first area, to determine the second area.

Operation 704: The NWDAF sends a third message to the AF through the network exposure function NEF.

In one embodiment, the NWDAF sends a fourth query request to the AF through the network exposure function NEF, to obtain a list of identifiers of UEs accessing the application instance of the target application in the second area.

In one embodiment, the NWDAF sends a fourth subscription request for accessing in the second area to the AF through the network exposure function NEF, so that when a first reporting condition is met, the AF sends an identifier of at least one terminal device accessing the application instance of the target application in the second area. The first reporting condition includes one or more of the following: a reporting periodicity expires, a quantity of terminal devices that access the application instance of the target application in the second area and that are subscribed to by a data analysis network element reaches a first reporting threshold, or a quantity of terminal devices accessing the application instance of the target application in the second area changes.

Operation 705: The AF sends, to the network exposure function NEF, an external identifier of the terminal device accessing the application instance of the target application in the second area.

In one embodiment, the AF sends, to the network exposure function NEF, the list of identifiers of the UEs accessing the application instance of the target application in the second area.

In one embodiment, the AF sends, to the network exposure function NEF when the first reporting condition is met, the identifier of the at least one terminal device accessing the application instance of the target application in the second area.

It should be noted that because the AF is an untrusted AF in a core network, the identifier that is of the terminal device accessing the application instance of the target application in the second area and that is sent by the AF to the NEF is an external identifier of the terminal device.

Operation 706: The NEF sends an internal identifier query request to a UDM, where the internal query request includes an external identifier of one or more terminal devices accessing the application instance of the target application in the second area.

The internal identifier of the terminal device may be an identifier of the terminal device used by the AMF, for example, may be a subscription permanent identifier (SUPI) or a permanent equipment identifier (PEI). Further, the NWDAF obtains, by using the internal identifier of the terminal device returned by the UDM, the internal identifier of the terminal device accessing the application instance of the target application in the second area in an operator network.

Operation 707: The UDM sends, to the NEF, the internal identifier of the at least one terminal device accessing the application instance of the target application in the second area.

Operation 708: The NEF sends, to the NWDAF, the internal identifier of the one or more terminal devices accessing the application instance of the target application in the second area.

Operation 709: The NWDAF sends a fourth message to an AMF.

The fourth message includes the internal identifier of the terminal device accessing the application instance of the target application in the second area. The fourth message is used to obtain location information of a terminal device whose location changes in the terminal devices accessing the application instance of the target application in the second area.

In one embodiment, the NWDAF sends a fifth query request to the AMF, where the fifth query request is used to subscribe to the location information of the terminal device whose location changes in the terminal devices accessing the application instance of the target application in the second area, and the fifth query request carries the internal identifier of the terminal device accessing the application instance of the target application in the second area.

In one embodiment, the NWDAF may send a fifth subscription request to the AMF, where the fifth subscription request is used to subscribe to the location information of the terminal device whose location changes in the terminal devices accessing the application instance of the target application in the second area, and the fifth subscription request carries the internal identifier of the terminal device accessing the application instance of the target application in the second area.

Operation 7010: The AMF sends, to the NWDAF, the location information of the terminal device whose location changes in the terminal devices accessing the application instance of the target application in the second area.

In one embodiment, the AMF sends a fifth query response to the NWDAF. In one embodiment, the fifth query response includes the location information of the terminal device accessing the application instance of the target application in the second area.

In one embodiment, when a second reporting condition is met, the AMF sends, to the NWDAF, the location information of the terminal device whose location changes in the terminal devices accessing the application instance of the target application in the second area. For example, when the location of the terminal device accessing the application instance of the target application in the second area changes, the AMF sends, to the NWDAF, a location change notification message of the terminal device.

Operation 7011: The NWDAF determines the first indication information.

For example, when the first indication information includes a predicted quantity of terminal devices that are to enter the first area and access the application instance of the target application, the NWDAF may predict, based on the location information of the UE that is reported by the AMF, whether the UE is to enter the first area. In one embodiment, the NWDAF may determine the location information of the UE, namely, information about a cell in which the UE is located, based on the location information of the UE that is reported by the AMF. Alternatively, the NWDAF may determine latitude and longitude information of the UE based on an obtained measurement report of the UE. Further, the NWDAF may further draw a movement track of the UE at a cell granularity or a latitude and longitude granularity based on historical location information (a cell or latitude and longitude) of the UE and the location information of the UE, and may further obtain a movement direction and speed of the UE. The predicted movement direction and speed of the UE may be represented as: predicting a next cell that the UE enters and a time point at which the UE enters.

Operation 7012: The NWDAF sends a response message of the first message to the AF through the NEF network element.

The response message of the first message may carry the first indication information, for example, carry the predicted quantity of terminal devices accessing the application instance of the target application in the first area. In one embodiment, the response message of the first message may further carry a predicted list of external identifiers of the terminal devices accessing the application instance of the target application in the first area, to meet a requirement of the AF. Further, to avoid repeatedly sending prediction information of the terminal device to the first network element, the NWDAF may collect statistics about a prediction and analysis result, and send the first indication information to the first network element when a third reporting condition is met. The third reporting condition includes one or more of the following: a quantity of terminal devices whose locations change and that are to access the application instance of the target application is greater than a first preset threshold, a quantity of terminal devices that are to leave the first area and access the application instance of the target application is greater than a second preset threshold, a quantity of terminal devices that are to enter the first area and access the application instance of the target application is greater than a third preset threshold, or a reporting periodicity expires.

Operation 7013: The AF deploys the application instance of the target application in the first area based on the first indication information.

Figure 8:
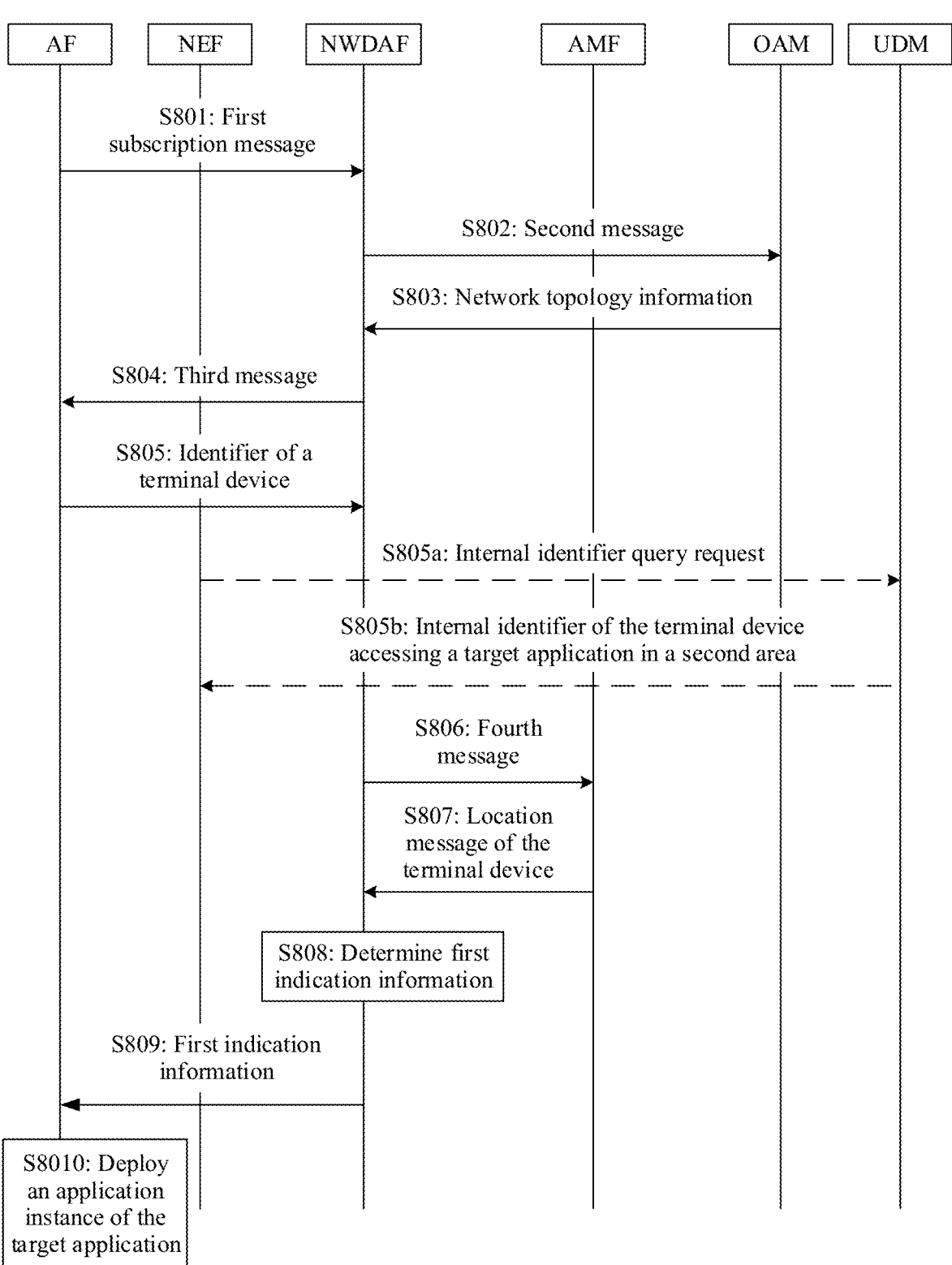
FIG. 8 is a schematic flowchart of another application instance deployment method according to this application.

The following provides an embodiment where the data analysis network element is an NWDAF, the first network element is an AF/NFs, and the second network element is 5GC NFs. The AF in the foregoing procedure may be an application management system, or may be a component of an MEC management system. The AF may directly interact with the NWDAF, or may interact with the NWDAF through a network exposure function NEF. FIG. 8 is a schematic flowchart of another application instance deployment method according to this application. The method includes the following operations.

Operation 801: An AF sends a first subscription request to an NWDAF.

The first subscription request may be in an event subscription manner. For example, the AF may further send a subscription event to a network element in a 5GC. The subscription event is used by the network element in the 5GC to obtain first indication information when a third reporting condition is met. Herein, an example in which the AF sends the first subscription request to the NWDAF is used for description. The third reporting condition includes one or more of the following: a quantity of terminal devices whose locations change and that are to access an application instance of a target application is greater than a first preset threshold, a quantity of terminal devices that are to leave a first area and access the application instance of the target application is greater than a second preset threshold, a quantity of terminal devices that are to enter the first area and access the application instance of the target application is greater than a third preset threshold, or a reporting periodicity expires.

It should be noted that, if the AF is a trusted AF in a core network, the AF may directly send the first subscription request to the NWDAF; or if the AF is an untrusted AF in the core network, the AF needs to send the first subscription request to the NWDAF through a network exposure function NEF.

Correspondingly, the NWDAF receives the first subscription request sent by the AF.

In this case, if the AF is the trusted AF in the core network, the NWDAF may directly receive the first subscription request sent by the AF; or if the AF is the untrusted AF in the core network, the NWDAF needs to receive, through the network exposure function NEF, the first subscription request sent by the AF.

Operation 802: The NWDAF sends a second query request to an OAM.

The second query request is used to obtain network topology information, where the network topology information includes location information of a second area that is used to indicate a location indicated by indication information of the first area.

Operation 803: The OAM sends a second query response to the NWDAF.

The second query response includes the network topology information of the second area, and the network topology information includes indication information used to indicate an area adjacent to the first area.

Operation 804: The NWDAF sends a third message to the AF.

The third message may include the network topology information of the second area. The third message is used to obtain an identifier of the terminal device accessing the application instance of the target application in the second area.

In one embodiment, the NWDAF sends a third query request to the AF, to obtain a list of identifies of UEs accessing the application instance of the target application in the second area. The third query request may include the network topology information of the second area.

If the AF is the trusted AF in the core network, the AF may directly send the third query request to the AF; or if the AF is the untrusted AF in the core network, the NWDAF needs to send a fourth query request to the AF through the network exposure function NEF. The fourth query request is used to obtain a list of external identifiers of the UEs accessing the application instance of the target application in the second area. The fourth query request may include the network topology information of the second area.

In one embodiment, the NWDAF sends a third subscription request for accessing in the second area to the AF, where the third subscription request for accessing in the second area may include the network topology information of the second area. Further, when the first reporting condition is met, the AF sends an identifier of at least one terminal device accessing the application instance of the target application in the second area. The first reporting condition includes one or more of the following: a reporting periodicity expires, a quantity of terminal devices that access the application instance of the target application in the second area and that are subscribed to by a data analysis network element reaches a first reporting threshold, or a quantity of terminal devices accessing the application instance of the target application in the second area changes.

It should be noted that, if the AF is the trusted AF in the core network, the NWDAF may directly send the third subscription request for accessing in the second area to the AF; or if the AF is the untrusted AF in the core network, the NWDAF needs to send a fourth subscription request for accessing in the second area to the AF through the network exposure function NEF. The fourth subscription request is used to obtain the list of external identifiers of the UEs accessing the application instance of the target application in the second area. The fourth subscription request may include the network topology information of the second area.

Operation 805: The AF sends, to the NWDAF, an internal identifier of one or more terminal devices accessing the application instance of the target application in the second area.

In one embodiment, the AF sends a third query response to the NWDAF, where the third query response includes the list of identifiers of the UEs accessing the application instance of the target application in the second area.

If the AF is an AF inside the core network, the AF may directly send the third query response to the NWDAF; or if the AF is an AF outside the core network, the AF needs to send a fourth query response to the NWDAF through the network exposure function NEF.

In one embodiment, when the first reporting condition is met, the AF sends an identifier of at least one terminal device accessing the application instance of the target application in the second area.

If the AF is an AF inside the core network, when the first reporting condition is met, the AF may directly send, to the NWDAF, the identifier of the at least one terminal device accessing the application instance of the target application in the second area. In this case, the identifier of the terminal device accessing the application instance of the target application in the second area is an internal identifier.

If the AF is an AF outside the core network, when the first reporting condition is met, the AF sends, to the network exposure function NEF, a list of terminal devices of an external identifier of the terminal device accessing the application instance of the target application in the second area. Further, the NEF performs operation 805a and operation 805b, so that the NWDAF receives a list of terminal devices of the internal identifier of the terminal device accessing the application instance of the target application in the second area.

Operation 805a: The NEF sends an internal identifier query request to a UDM.

The internal identifier query request may include the external identifier of the at least one terminal device accessing the application instance of the target application in the second area, and is used to obtain the identifier, in an operator network, of the terminal device accessing the application instance of the target application in the second area.

Operation 805b: The UDM sends an internal identifier query response to the NEF, where the internal identifier query response includes the internal identifier of the terminal device accessing the application instance of the target application in the second area. Further, the NEF sends, to the NEDAF, the list of terminal devices of the internal identifier of the terminal device accessing the application instance of the target application in the second area.

Operation 806: The NWDAF sends a fourth message to an AMF.

The fourth message may include the internal identifier of the terminal device accessing the application instance of the target application in the second area. The fourth message is used to obtain location information of a terminal device whose location changes in the terminal devices accessing the application instance of the target application in the second area.

In one embodiment, the NWDAF sends a fifth query request to the AMF, where the fifth query request carries the internal identifier of the terminal device accessing the application instance of the target application in the second area.

In one embodiment, the NWDAF may send a fifth subscription request to the AMF, where the fifth subscription request is used to subscribe to the location information of the terminal device whose location changes in the terminal devices accessing the application instance of the target application in the second area, and the fifth subscription request carries the internal identifier of the terminal device accessing the application instance of the target application in the second area. Further, when a second reporting condition is met, the AMF sends, to the NWDAF, the location information of the terminal device whose location changes in the terminal devices accessing the application instance of the target application in the second area.

Operation 807: The AMF sends, to the NWDAF, the location information of the terminal device whose location changes in the terminal devices accessing the application instance of the target application in the second area.

In one embodiment, the AMF sends a fifth query response to the NWDAF. In one embodiment, the fifth query response includes the location information of the terminal device whose location changes in the terminal devices accessing the application instance of the target application in the second area.

In one embodiment, when the second reporting condition is met, the AMF sends, to the NWDAF, the location information of the terminal device accessing the application instance of the target application in the second area. For example, when the location of the terminal device accessing the application instance of the target application in the second area changes, the AMF sends, to the NWDAF, a location change notification message of the terminal device.

Operation 808: The NWDAF determines the first indication information.

For example, when the first indication information includes a predicted quantity of terminal devices that are to enter the first area and access the application instance of the target application, the NWDAF may predict, based on the location information of the UE that is reported by the AMF, whether the UE is to enter the first area. Further, the NWDAF may further collect statistics about prediction information of the terminal device.

Further, after obtaining, from the AF, a list of identifiers of UEs accessing the application instance of the target application in the second area, the NWDAF may subscribe, from the AF, to a change event of the UE accessing the application instance of the target application in the second area. When there is new UE accessing the application instance of the target application in the second area, or the UE accessing the application instance of the target application in the second area goes offline, the AF sends a notification message to the NWDAF, where the notification message carries an external identifier of changed UE accessing the application instance of the target application in the second area and an identifier of online UE/offline UE. If there is online UE, the NWDAF subscribes to a location change event of the online UE from the AMF. If there is offline UE, the NWDAF can unsubscribe from a location change event of the offline UE from the AMF.

Operation 809: The NWDAF sends the first indication information to the AF when determining that a third reporting condition is met.

The first indication information may include at least one of the following: the predicted quantity of terminal devices accessing the application instance of the target application in the first area, and a predicted list of external identifiers of the terminal devices accessing the application instance of the target application in the first area.

It should be noted that if the AF is an AF inside the core network, the NWDAF may directly send, to the AF, the prediction information of the terminal device that subscribes to the application instance of the target application in the first area in a first time period; or if the AF is an AF outside the core network, the NWDAF needs to send, to the AF through the network exposure function NEF, the prediction information of the terminal device that subscribes to the application instance of the target application in the first area in a first time period.

Operation 8010: The AF deploys the application instance of the target application in the first area based on the first indication information.

The foregoing mainly describes the solutions provided in embodiments of this application from a perspective of interaction between the network elements. It may be understood that, to implement the foregoing functions, each network element includes a corresponding hardware structure and/or software module for implementing each function. A person of ordinary skill in the art should easily be aware that, in combination with the examples described in embodiments disclosed in this specification, units and algorithms operations may be implemented by hardware or a combination of hardware and computer software in the present disclosure. Whether a function is performed by hardware or hardware driven by computer software depends on particular applications and design constraints of the technical solutions. A person skilled in the art may use different methods to perform the described functions for each particular application, but it should not be considered that the embodiment goes beyond the scope of the present disclosure.

Figure 9:
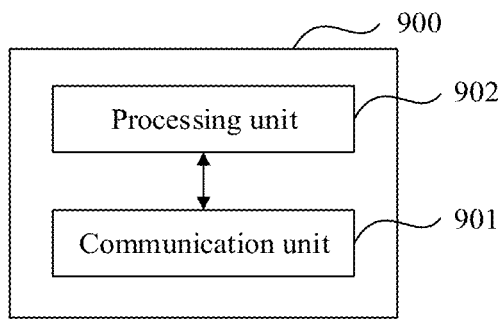
FIG. 9 is a schematic diagram of an application instance deployment apparatus according to this application.

FIG. 9 is a possible example block diagram of an application instance deployment apparatus according to an embodiment of this application. The apparatus 900 may exist in a form of software or hardware. The apparatus 900 may include a processing unit 902 and a communication unit 901. In one embodiment, the communication unit 901 may include a receiving unit and a sending unit. The processing unit 902 is configured to control and manage an action of the apparatus 900. The communication unit 901 is configured to support the apparatus 900 in communicating with another network entity.

The processing unit 902 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in embodiments of this application. Alternatively, the processor may be a combination of processors implementing a computing function, for example, including a combination of one or more microprocessors, or a combination of the DSP and a microprocessor. The communication unit 901 is an interface circuit of the apparatus, and is configured to receive a signal from another apparatus. For example, when the apparatus is implemented in a form of a chip, the communication unit 901 is an interface circuit used by the chip to receive a signal from another chip or apparatus, or is an interface circuit used by the chip to send a signal to another chip or apparatus The apparatus 900 may be the NWDAF network element or the first network element in the foregoing embodiments, or may be a chip used in the NWDAF network element or a chip used in the first network element. For example, when the apparatus 900 is the NWDAF network element or the first network element, the processing unit 902 may be, for example, a processor, and the communication unit 901 may be, for example, a transceiver. In one embodiment, the transceiver may include a radio frequency circuit, and the storage unit may be, for example, a memory. For example, when the apparatus 900 is the chip used in the data analysis network element or the first network element, the processing unit 902 may be, for example, a processor, and the communication unit 901 may be, for example, an input/output interface, a pin, or a circuit. The processing unit 902 may execute computer-executable instructions stored in a storage unit. In one embodiment, the storage unit is a storage unit in the chip, such as a register or a cache. Alternatively, the storage unit may be a storage unit that is in the data analysis network element or the first network element and that is located outside the chip, for example, a read-only memory (ROM) or another type of static storage device that can store static information and instructions, or a random access memory (RAM).

In an embodiment, the apparatus 900 is the NWDAF network element in the foregoing embodiments. The communication unit 901 is configured to: receive a first message from the first network element, where the first message is used to request first indication information, the first indication information is used to indicate prediction information of a terminal device accessing an application instance of a target application in a first area, and the first message includes indication information used to indicate the first area; and send the first indication information to the first network element. The processing unit 902 is configured to determine the first indication information.

In an embodiment, the first indication information includes at least one of the following: a predicted quantity of terminal devices accessing the application instance of the target application in the first area; a predicted quantity of terminal devices that are to leave the first area and that are in the terminal device accessing the application instance of the target application in the first area; and a predicted quantity of terminal devices that are to enter the first area and access the application instance of the target application.

In an embodiment, the first indication information includes the predicted quantity of terminal devices that are to enter the first area and access the application instance of the target application; and when determining the first indication information, the processing unit 902 is configured to: obtain, through the communication unit 901, N1 terminal devices accessing an application instance of the target application in a second area; obtain location information of a terminal device in the N1 terminal devices through the communication unit 901; and analyze the location information of the terminal device in the N1 terminal devices, and predict, from the N1 terminal devices, N2 terminal devices that are to enter the first area, where the second area is an area adjacent to the first area.

In an embodiment, the first indication information includes the predicted quantity of terminal devices that leave the first area and that are in the terminal device accessing the application instance of the target application in the first area; and when determining the first indication information, the processing unit 902 is configured to: obtain, through the communication unit 901, M1 terminal devices accessing the application instance of the target application in the first area;

obtain, through the communication unit 901, location information of a terminal device in the M1 terminal devices; and analyze the location information of the terminal device in the M1 terminal devices, and predict, from the M1 terminal devices, a quantity of terminal devices that are to leave the first area and that are in the terminal devices accessing the application instance of the target application in the first area.

In an embodiment, the processing unit 902 is further configured to: send a second message to an operation, administration, and maintenance network element through the communication unit 901, where the second message includes the indication information used to indicate the first area; receive, through the communication unit 901, network topology information returned by the operation, administration, and maintenance network element, where the network topology information is used to indicate an area adjacent to the first area; and determine the second area based on the area adjacent to the first area.

In an embodiment, the processing unit 902 is further configured to: send a third message to the first network element through the communication unit 901, where the third message is used to obtain identifiers of the terminal devices accessing the application instance of the target application in the second area, and the third message includes indication information used to indicate the second area; and receive, through the communication unit 901, the identifiers that are of the N1 terminal device accessing the application instance of the target application in the second area and that are returned by the first network element.

In an embodiment, the processing unit 902 is further configured to: send a third query request to an application function network element through the communication unit 901, where the third query request includes the indication information used to indicate the second area; and receive, through the communication unit 901, an identifier that is of at least one terminal device accessing the application instance of the target application in the second area and that is returned by the application function network element.

In an embodiment, the processing unit 902 is further configured to: send a fourth message to an access and mobility management function network element through the communication unit 901, where the fourth message is used to obtain location information of a terminal device whose location changes in the terminal devices accessing the application instance of the target application in the second area, and the fourth message includes the identifiers of the terminal devices accessing the application instance of the target application in the second area; and receive the location information of the terminal device from the access and mobility management function network element through the communication unit 901.

In an embodiment, the indication information used to indicate the first area includes at least one of the following: an identifier of one or more cells included in the first area; an identity of one or more tracking areas included in the first area; a geometric area including one or more pieces of coordinate information of the first area; or administrative region information of the first area.

In an embodiment, the apparatus 900 is the first network element in the foregoing embodiments. In one embodiment, the first network element is a network function network element or an application function network element. In one embodiment, the application function network element is a multi-access edge computing management component managing an application instance of a target application, an application operation and maintenance system managing the application instance of the target application, or a multi-access edge computing platform.

The communication unit 901 is configured to: send a first message to a data analysis network element, where the first message is used to request to obtain first indication information, the first indication information is used to indicate prediction information of a terminal device accessing an application instance of a target application in a first area, and the first message includes indication information used to indicate the first area; and receive the first indication information from the data analysis network element.

The processing unit 902 is configured to deploy the application instance of the target application in the first area based on the first indication information.

In an embodiment, the first indication information includes at least one of the following: a predicted quantity of terminal devices accessing the application instance of the target application in the first area; a predicted quantity of terminal devices that are to leave the first area and that are in the terminal device accessing the application instance of the target application in the first area; and a predicted quantity of terminal devices that are to enter the first area and access the application instance of the target application.

In one embodiment, the processing unit 902 is further configured to: receive a third message from the data analysis network element through the communication unit 901, where the third message includes indication information used to indicate a second area, and the third message is used to obtain an identifier of at least one terminal device accessing an application instance of the target application in the second area; and send, to the data analysis network element through the communication unit 901, the identifier of the at least one terminal device accessing the application instance of the target application in the second area.

In one embodiment, the processing unit 902 is configured to: if determining that the prediction information of the terminal device accessing the application instance of the target application in the first area is greater than a first threshold, correspondingly increase a quantity of application instances of the target application in the first area; or if determining that the prediction information of the terminal device accessing the application instance of the target application in the first area is less than a second threshold, correspondingly decrease a quantity of application instances of the target application in the first area.

In one embodiment, the indication information used to indicate the first area includes at least one of the following: an identifier of one or more cells included in the first area; an identity of one or more tracking areas included in the first area; a geometric area including one or more pieces of coordinate information of the first area; or administrative region information of the first area.

It may be understood that, for corresponding beneficial effects of the apparatus used in the foregoing application instance deployment method, refer to related descriptions in the foregoing method embodiments. Details are not described herein again.

Figure 10:
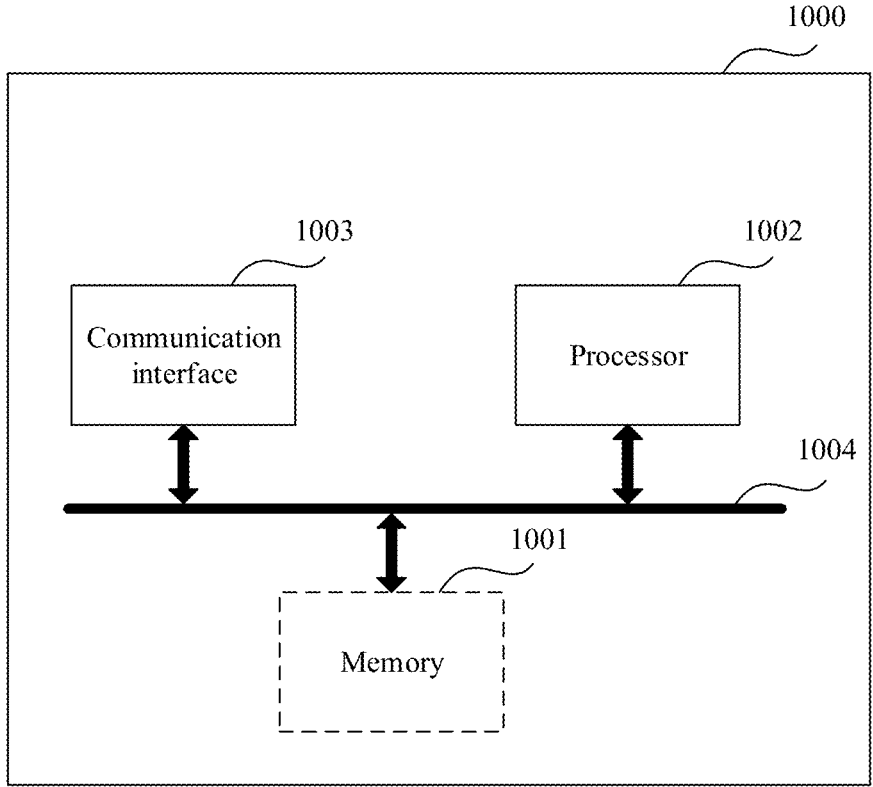
FIG. 10 is a schematic diagram of another application instance deployment apparatus according to this application.

FIG. 10 is a schematic diagram of an application instance deployment apparatus according to an embodiment of this application. The apparatus may be the NWDAF network element and/or the first network element in the foregoing embodiments. The apparatus 1000 includes a processor 1002 and a communication interface 1003. In one embodiment, the apparatus 1000 may further include a memory 1001. In one embodiment, the apparatus 1000 may further include a communication line 1004. The communication interface 1003, the processor 1002, and the memory 1001 may be connected to each other through the communication line 1004. The communication line 1004 may be a peripheral component interconnect (PCI) bus, an extended industry standard architecture (EISA) bus, or the like. The communication line 1004 may be classified into an address bus, a data bus, a control bus, and the like. For ease of representation, only one thick line is used to represent the bus in FIG. 9, but this does not mean that there is only one bus or only one type of bus.

The processor 1002 may be a CPU, a microprocessor, an ASIC, or one or more integrated circuits configured to control program execution in the solutions in embodiments of this application.

The processor 1002 may be configured to: determine first indication information, where the first indication information is used to indicate prediction information of a terminal device accessing an application instance of a target application in a first area; and send the first indication information to the first network element. Alternatively, the processor 1002 may be configured to deploy an application instance of a target application in a first area based on first indication information.

The communication interface 1003 uses any apparatus such as a transceiver, and is configured to communicate with another device or a communication network such as an Ethernet, a radio access network (RAN), a wireless local area network (WLAN), or a wired access network.

The communication interface 1003 may be configured to: receive a first message from the first network element, where the first message is used to request to obtain the first indication information, the first indication information is used to indicate the prediction information of the terminal device accessing the application instance of the target application in the first area, and the first message includes indication information used to indicate the first area; and send the first indication information to the first network element. Alternatively, the communication interface 1003 may be configured to: send a first message to a data analysis network element, where the first message is used to request to obtain the first indication information; and receive the first indication information from the data analysis network element. The first indication information is used to indicate the prediction information of the terminal device accessing the application instance of the target application in the first area.

The memory 1001 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or other compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in an instruction form or a data structure form and that can be accessed by a computer. However, the memory 1001 is not limited thereto. The memory may exist independently, and is connected to the processor through the communication line 1004. Alternatively, the memory may be integrated with the processor.

The memory 1001 is configured to store computer-executable instructions for executing the solutions in embodiments of this application, and the processor 1002 controls execution of the computer-executable instructions. The processor 1002 is configured to execute the computer-executable instructions stored in the memory 1001, to implement the application instance deployment method provided in the foregoing embodiments of this application.

In one embodiment, the computer-executable instructions in embodiments of this application may also be referred to as application program code. This is not limited in embodiments of this application.

In the descriptions of this application, "I" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two. The term "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a manner for ease of understanding.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

The various illustrative logical units and circuits described in embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. In one embodiment, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Operations of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. In one embodiment, the storage medium may alternatively be integrated into the processor. The processor and the storage medium may be disposed in the ASIC.

These computer program instructions may also be loaded onto a computer or another programmable data processing device, so that a series of operations are performed on the computer or another programmable device, thereby generating computer-implemented processing. Therefore, the instructions executed on the computer or another programmable device provide operations for implementing a function in one or more processes in the flowcharts and/or in one or more blocks in the block diagrams.

Although this application is described with reference to features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. In this way, this application is intended to cover these modifications and variations of this application provided that they fall within the scope of the claims of this application and their equivalent technologies.

55

56

What is claimed is:

1. A communication method, comprising:

receiving, by a data analysis network element, a first message from a first network element that requests first indication information comprising prediction information of a terminal device accessing an application instance of a target application in a first area, wherein the first message comprises an application identifier of the application instance of the target application, the first message further comprises indication information that indicates the first area, wherein the first area is an area served by a first edge node, and the prediction information of the terminal device is used to assist in deploying the application instance of the target application on the first edge node; determining, by the data analysis network element, the first indication information; and sending, by the data analysis network element, the first indication information to the first network element, wherein the first indication information comprises at least one of the following:

a predicted first quantity of terminal devices accessing the application instance of the target application in the first area;

a predicted second quantity of terminal devices that are to leave the first area and that are in the terminal device accessing the application instance of the target application in the first area; or a predicted third quantity of terminal devices that are to enter the first area and access the application instance of the target application.

2. The method according to claim 1, wherein the first indication information comprises a predicted quantity of terminal devices that are to leave the first area and that are in the terminal device accessing the application instance of the target application in the first area; and the determining, by the data analysis network element, the first indication information comprises:

obtaining, by the data analysis network element, M1 terminal devices accessing the application instance of the target application in the first area, wherein M1 is a positive integer;

obtaining, by the data analysis network element, location information of the M1 terminal devices;

analyzing, by the data analysis network element, the location information of the M1 terminal devices; and predicting, from the M1 terminal devices, the predicted quantity of terminal devices that are to leave the first area and that are in the terminal devices accessing the application instance of the target application in the first area.

3. The method according to claim 1, wherein the first indication information comprises a predicted quantity of terminal devices that are to enter the first area and access the application instance of the target application; and the determining, by the data analysis network element, of the first indication information comprises:

obtaining, by the data analysis network element, N1 terminal devices accessing an application instance of the target application in a second area, wherein N1 is a positive integer;

obtaining, by the data analysis network element, location information of the N1 terminal devices;

analyzing, by the data analysis network element, the location information of the N1 terminal devices; and predicting, from the N1 terminal devices, N2 terminal devices that are to enter the first area, wherein N2 is less than or equal to N1, and N2 is a positive integer, and the second area is an area adjacent to the first area.

4. The method according to claim 3, wherein after the receiving the first message from a first network element, and before the obtaining the NI terminal devices, the method further comprises:

sending, by the data analysis network element, a second message to an operation, administration, and maintenance network element, wherein the second message comprises the indication information used to indicate the first area;

receiving, by the data analysis network element, network topology information from the operation, administration, and maintenance network element, wherein the network topology information is used to indicate an area adjacent to the first area; and determining, by the data analysis network element, the second area based on the area adjacent to the first area.

5. The method according to claim 1, wherein the indication information used to indicate the first area comprises at least one of the following:

an identifier of one or more cells comprised in the first area;

an identity of one or more tracking areas comprised in the first area;

a geometric area comprising one or more pieces of coordinate information of the first area; or administrative region information of the first area.

6. The method according to claim 1, wherein the first network element is a network function network element or an application function network element.

7. An apparatus, comprising:

a processor, coupled to a memory, wherein, when executing instructions in the memory, the processor is configured to:

receive a first message from a first network element that requests first indication information comprising prediction information of a terminal device accessing an application instance of a target application in a first area, wherein the first message comprises an application identifier of the application instance of the target application, the first message further comprises indication information that indicates the first area, wherein the first area is an area served by a first edge node, and the prediction information of the terminal device is used to assist in deploying the application instance of the target application on the first edge node;

determine the first indication information; and send the first indication information to the first network element, wherein the first indication information comprises at least one of the following:

a predicted first quantity of terminal devices accessing the application instance of the target application in the first area;

a predicted second quantity of terminal devices that are to leave the first area and that are in the terminal device accessing the application instance of the target application in the first area; or a predicted third quantity of terminal devices that are to enter the first area and access the application instance of the target application.

8. The apparatus according to claim 7, wherein the first indication information comprises a predicted quantity of terminal devices that are to enter the first area and access the application instance of the target application; and the processor, to determine the first indication information, is further configured to:

obtain N1 terminal devices accessing an application instance of the target application in a second area, wherein N1 is a positive integer;

obtain location information of the N1 terminal devices;

analyze the location information of the NI terminal devices; and predict, from the N1 terminal devices, N2 terminal devices that are to enter the first area, wherein the second area is an area adjacent to the first area, N2 is less than or equal to N1, and N2 is a positive integer.

9. The apparatus according to claim 8, wherein the processor is configured to:

send a second message to an operation, administration, and maintenance network element, wherein the second message comprises the indication information used to indicate the first area;

receive network topology information from the operation, administration, and maintenance network element, wherein the network topology information is used to indicate an area adjacent to the first area; and determine the second area based on the area adjacent to the first area.

10. The apparatus according to claim 7, wherein the first indication information comprises a predicted quantity of terminal devices that are to leave the first area and that are in the terminal device accessing the application instance of the target application in the first area; and the processor, to determine the first indication information, is further configured to:

obtain M1 terminal devices accessing the application instance of the target application in the first area, wherein M1 is a positive integer;

obtain location information of the M1 terminal devices;

analyze the location information of the M1 terminal devices; and predict, from the M1 terminal devices, a quantity of terminal devices that are to leave the first area and that are in the terminal devices accessing the application instance of the target application in the first area.

11. The apparatus according to claim 7, wherein the indication information used to indicate the first area comprises at least one of the following:

an identifier of one or more cells comprised in the first area;

an identity of one or more tracking areas comprised in the first area;

a geometric area comprising one or more pieces of coordinate information of the first area; or administrative region information of the first area.

12. The apparatus according to claim 7, wherein the apparatus is a data analysis network element, and wherein the first network element is a network function network element or an application function network element.

13. An apparatus, comprising:

a memory; and a processor, coupled to the memory, wherein the processor, when executing instructions in the memory, is configured to:

send a first message to a data analysis network element, wherein the first message is used to request first indication information;

receive the first indication information from the data analysis network element, wherein the first indication information indicates prediction information of a terminal device accessing an application instance of a target application in a first area, wherein the first message comprises an application identifier of the application instance of the target application;

the first message further comprises indication information that indicates the first area, wherein the first area is an area served by a first edge node;

the prediction information of the terminal device is used to assist in deploying the application instance of the target application on the first edge node;

the first indication information comprises at least one of the following:

a predicted first quantity of terminal devices accessing the application instance of the target application in the first area;

a predicted second quantity of terminal devices that are to leave the first area and that are in the terminal device accessing the application instance of the target application in the first area; or a predicted third quantity of terminal devices that are to enter the first area and access the application instance of the target application; and deploy the application instance of the target application in the first area based on the first indication information.

14. The apparatus according to claim 13, wherein the processor, to deploy the application instance of the target application, is further configured to:

responsive to determining that the prediction information of the terminal device accessing the application instance of the target application in the first area is greater than a first threshold, increase a quantity of application instances of the target application in the first area; or responsive to determining that the prediction information of the terminal device accessing the application instance of the target application in the first area is less than a second threshold, decrease a quantity of application instances of the target application in the first area.

15. The apparatus according to claim 13, wherein the apparatus is a network function network element or an application function network element.

16. A communication method, comprising:

sending a first message to a data analysis network element, wherein the first message is used to request first indication information;

receiving the first indication information from the data analysis network element, wherein the first indication information indicates prediction information of a terminal device accessing an application instance of a target application in a first area, wherein the first message comprises an application identifier of the application instance of the target application;

the first message further comprises indication information that indicates the first area, wherein the first area is an area served by a first edge node;

the prediction information of the terminal device is used to assist in deploying the application instance of the target application on the first edge node;

the first indication information comprises at least one of the following:

a predicted first quantity of terminal devices accessing the application instance of the target application in the first area;

a predicted second quantity of terminal devices that are to leave the first area and that are in the terminal device accessing the application instance of the target application in the first area; or a predicted third quantity of terminal devices that are to enter the first area and access the application instance of the target application; and deploying the application instance of the target application in the first area based on the first indication information.

17. The method according to claim 16, wherein the indication information used to indicate the first area comprises at least one of the following:

an identifier of one or more cells comprised in the first area;

an identity of one or more tracking areas comprised in the first area;

a geometric area comprising one or more pieces of coordinate information of the first area; or administrative region information of the first area.

\* \* \* \* \*